(12) United States Patent
John et al.

(10) Patent No.: US 10,893,043 B1
(45) Date of Patent: Jan. 12, 2021

(54) SYSTEMS AND METHODS FOR SECURE DISPLAY OF DATA ON COMPUTING DEVICES

(71) Applicant: MASSACHUSETTS MUTUAL LIFE INSURANCE COMPANY, Springfield, MA (US)

(72) Inventors: Jiby John, Suffield, CT (US); Michal Knas, Monson, MA (US); Damon Ryan Depaolo, Barkhamsted, CT (US); Payton A. Shubrick, Springfield, MA (US); Jason Cook, Westfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 134 days.

(21) Appl. No.: 16/129,477

(22) Filed: Sep. 12, 2018

(51) Int. Cl.
| | |
|---|---|
| *H04L 29/06* | (2006.01) |
| *G06K 9/00* | (2006.01) |
| *G06F 21/62* | (2013.01) |
| *H04W 12/06* | (2009.01) |
| *G06F 3/01* | (2006.01) |
| *H04W 4/80* | (2018.01) |

(52) U.S. Cl.
CPC ...... *H04L 63/0861* (2013.01); *G06F 21/6245* (2013.01); *G06K 9/0053* (2013.01); *G06K 9/00536* (2013.01); *G06K 9/00885* (2013.01); *H04L 63/0492* (2013.01); *H04L 63/083* (2013.01); *H04L 63/0853* (2013.01); *G06F 3/012* (2013.01); *G06F 3/013* (2013.01); *G06K 9/0061* (2013.01); *G06K 9/00281* (2013.01); *G06K 9/00288* (2013.01); *G06K 2009/00932* (2013.01); *G06K 2009/00939* (2013.01); *H04W 4/80* (2018.02); *H04W 12/06* (2013.01)

(58) Field of Classification Search
CPC ............ H04L 63/0861; H04L 63/0492; H04L 63/083; H04L 63/0853; G06K 9/00885; G06K 9/0053; G06K 9/00536; G06K 9/00281; G06K 9/00288; G06K 2009/00932; G06K 2009/00939; G06K 9/0061; G06F 21/6245; G06F 3/012; G06F 3/013; H04W 4/80; H04W 12/06
See application file for complete search history.

(56) References Cited

U.S. PATENT DOCUMENTS

| | | | |
|---|---|---|---|
| 3,781,109 A | 12/1973 | Mayer | |
| 6,565,089 B1 * | 5/2003 | Matos | A63F 9/0613 273/153 S |
| 7,819,311 B2 | 10/2010 | Rowe et al. | |
| 8,406,424 B2 | 3/2013 | Athsani et al. | |
| 9,491,425 B2 * | 11/2016 | Coulson | H04N 9/3197 |
| 10,396,985 B1 * | 8/2019 | Nagelberg | G06F 21/6245 |
| 2002/0101988 A1 | 8/2002 | Jones | |
| 2002/0172360 A1 * | 11/2002 | Matos | A63F 9/0613 380/54 |

(Continued)

*Primary Examiner* — Aravind K Moorthy
(74) *Attorney, Agent, or Firm* — Foley & Lardner LLP

(57) ABSTRACT

Disclosed herein are display techniques that will allow sensitive data displayed on a computer screen to only be viewed by authorized users and will render computer screen unreadable to unauthorized users. One or more display techniques are capable of automatically scrambling and unscrambling display screen of the computing device in which only an intended viewer is able to view data on the display screen using deciphering glasses.

20 Claims, 16 Drawing Sheets

(56) References Cited

U.S. PATENT DOCUMENTS

| | | | |
|---|---|---|---|
| 2003/0108198 A1* | 6/2003 | Lahiri | G06F 21/84 380/54 |
| 2003/0133569 A1* | 7/2003 | Stern | H04N 13/398 380/206 |
| 2007/0247392 A1* | 10/2007 | Littrell | G09G 5/00 345/8 |
| 2011/0142230 A1 | 6/2011 | Zuili | |
| 2013/0093788 A1* | 4/2013 | Liu | H04N 5/272 345/633 |
| 2013/0104217 A1* | 4/2013 | Kruger | G06F 21/31 726/7 |
| 2013/0139269 A1* | 5/2013 | Shaikh | G06F 21/62 726/26 |
| 2013/0301870 A1* | 11/2013 | Mow | G06T 1/0064 382/100 |
| 2014/0135592 A1 | 5/2014 | Ohnemus et al. | |
| 2014/0325678 A1 | 10/2014 | Kotla et al. | |
| 2015/0067580 A1 | 3/2015 | Um et al. | |
| 2015/0070481 A1 | 3/2015 | S. et al. | |
| 2015/0381609 A1* | 12/2015 | Dadu | G06F 21/32 726/9 |
| 2016/0057020 A1* | 2/2016 | Halmstad | H04L 67/26 715/740 |
| 2016/0116979 A1* | 4/2016 | Border | G06K 9/222 345/156 |
| 2016/0127641 A1 | 5/2016 | Gove | |
| 2017/0019789 A1 | 1/2017 | Rodzevski et al. | |
| 2017/0061164 A1* | 3/2017 | Schmugar | H04L 9/083 |
| 2017/0065188 A1* | 3/2017 | Jain | A61B 5/14542 |
| 2017/0083909 A1 | 3/2017 | Mork et al. | |
| 2017/0091490 A1* | 3/2017 | Cameron | G09G 3/2096 |
| 2017/0092235 A1* | 3/2017 | Osman | G06F 3/013 |
| 2017/0249574 A1* | 8/2017 | Knijnik | G06Q 10/06314 |
| 2017/0286650 A1* | 10/2017 | Hook | G06F 21/57 |
| 2018/0012061 A1* | 1/2018 | Nagano | G06K 9/00228 |
| 2018/0052983 A1* | 2/2018 | Stolbikov | G06F 21/32 |
| 2018/0130442 A1 | 5/2018 | Chan | |
| 2018/0275394 A1* | 9/2018 | Yeoh | G02B 26/004 |
| 2018/0285573 A1* | 10/2018 | Lantz | H04W 12/08 |
| 2018/0335939 A1* | 11/2018 | Karunamuni | G06F 3/0481 |
| 2019/0041644 A1* | 2/2019 | Abele | G06K 9/6267 |
| 2019/0042769 A1* | 2/2019 | Sukhomlinov | G06F 21/6245 |
| 2019/0043223 A1* | 2/2019 | Gao | G06T 9/20 |
| 2019/0080189 A1* | 3/2019 | Van Os | G06K 9/00288 |
| 2019/0095655 A1 | 3/2019 | Krawczewicz et al. | |
| 2019/0287486 A1* | 9/2019 | Khoury | G06F 3/013 |

\* cited by examiner

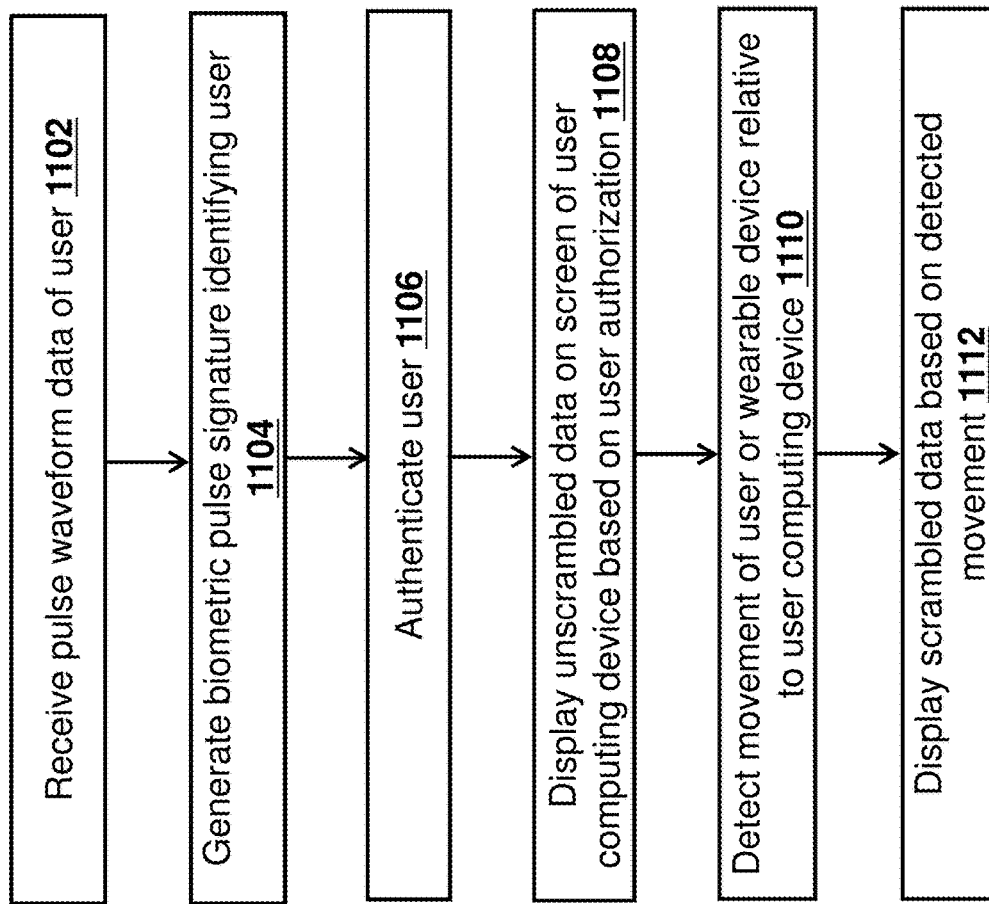

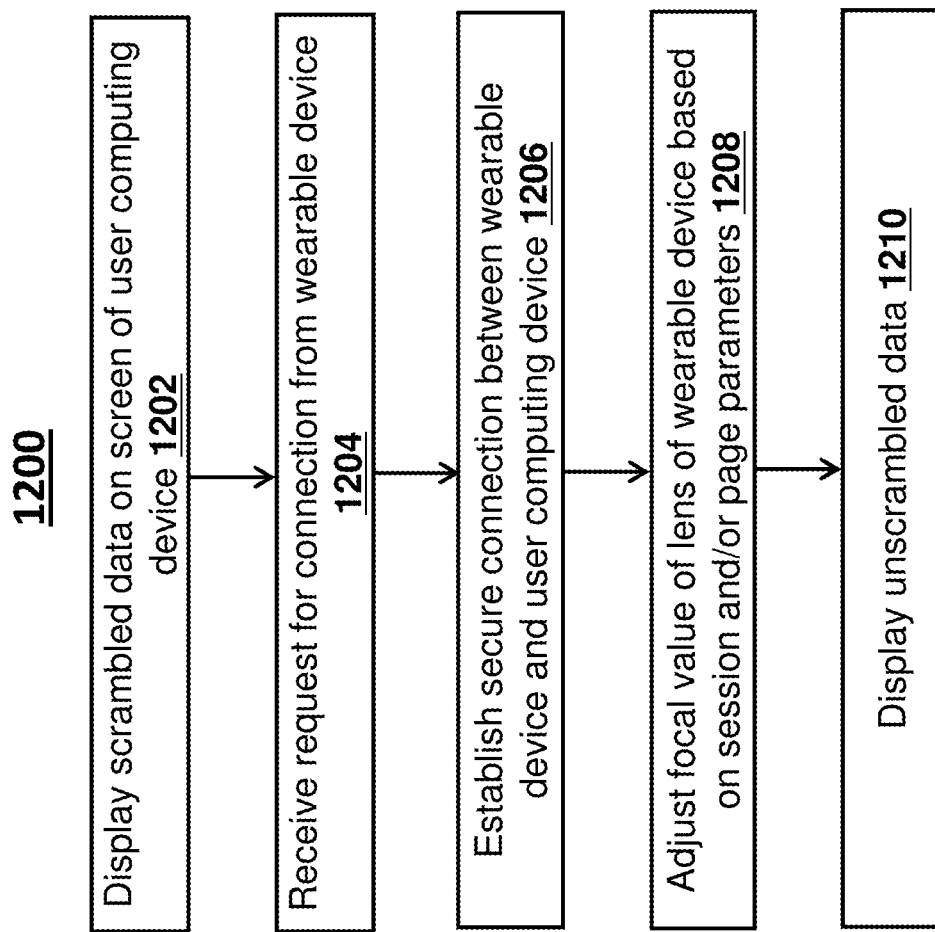

SYSTEMS AND METHODS FOR SECURE DISPLAY OF DATA ON COMPUTING DEVICES

TECHNICAL FIELD

This application relates generally to secure electronic display techniques. More specifically, this application relates to systems and methods for limiting electronic display of data to authorized users.

BACKGROUND

Most businesses and enterprise organizations are apprehensive about protection and secure display of their sensitive data. In order to protect and secure their sensitive data, various organizations typically have a "cleanroom," which is essentially a working room within the organization that is protected such that only authorized users are allowed to enter the cleanroom to access electronic devices and servers within the cleanroom. For instance, when the authorized user enters the cleanroom, the authorized person immediately connects to a network, and is able to access sensitive data and perform computing functions on the various electronic devices and the servers within the cleanroom. On the other hand, there are frequent circumstances when some users may want to access sensitive data when the cleanroom is not readily available. For instance, a user may be working remotely and may access the sensitive data on his/her personal or work-issued computing device. Such viewing of sensitive data in public usually raises security implications regarding unauthorized viewing of the sensitive data by others. Moreover, tracking the release of the sensitive data to such unauthorized viewers can be difficult since the unauthorized viewers do not get direct access to the sensitive data through any electronic device, and thus do not leave a digital fingerprint from which the unauthorized viewers could later be identified.

SUMMARY

For the aforementioned reasons, there is a need for a method and system for preventing the unauthorized users from viewing and accessing sensitive data. Disclosed herein are systems and methods capable of addressing the above-described shortcomings and may provide any number of additional or alternative benefits and advantages corresponding to scrambling techniques that will allow sensitive data displayed on a computer screen to only be viewed by authorized users and will render the computer screen unreadable to unauthorized users. For instance, the systems and the methods are capable of automatically scrambling and unscrambling display screen of the computing device in which only an intended viewer is able to view data on the display screen using deciphering glasses.

Systems, methods, and computer program products for security of content on a display screen of a computing device in which only an authenticated user is able to view the content on the display screen may automatically scramble and unscramble the screen depending on authentication results of the user looking at the screen. For instance, the computing device may utilize facial recognition or head movement detection techniques to authenticate the user looking at the screen, and upon the execution of the facial recognition or the head movement detection techniques, when it is determined that the authenticated user is no longer looking at the screen of the computing device, the screen becomes scrambled or locked.

Systems, methods, and computer program products for security of content on a display screen of a computing device in which a first user is able to view the content on the display screen may automatically scramble and unscramble the screen depending on authentication results of the first user looking at the screen. For instance, the computing device may utilize facial recognition or head movement detection apparatus to authenticate the first user looking at the screen, and upon the implementation of the facial recognition or the head movement detection apparatus, when a second user's face is detected by the computing device, the screen becomes scrambled or locked, even if the first user is authenticated (e.g., the second user looking over the shoulder of the authenticated first user).

Systems, methods, and computer program products disclosed herein automatically scrambles and unscrambles data on a display screen of a computing device in which an authenticated user is able to view the data on the display screen using deciphering glasses upon electro-biometric identification and verification of user's identity by bioelectric signal processing and analysis. A biometric pulse signature generation technique is executed to produce a biometric signature of the authenticated user that identifies the user by forming a representation of a pulse pattern of the authenticated user when the deciphering glasses are on the authenticated user. The computing device may perform the bioelectric signal processing and analysis to compare a biometric signature of an individual wanting to view the screen with the biometric signature of the authenticated user to determine whether the individual is the authenticated user, and the data becomes unscrambled when the individual is the authenticated user to allow the individual to view the data on the screen using the deciphering glasses.

Systems, methods, and computer program products disclosed herein automatically scrambles and unscrambles data on a graphical user interface (GUI) of a computing device in which an authenticated user is able to view the unscrambled data on the display screen using deciphering glasses. The display of the data on the GUI is automatically moved from a first display screen (showing unscrambled data) to a second display screen (showing scrambled data) on the GUI and vice-versa depending on a distance between the GUI and authenticated user wearing the deciphering glasses. For instance, a first display screen is presented on the GUI showing the unscrambled data when the GUI is in viewable Bluetooth range of a user authorized to view the data. A second display screen is presented on the GUI showing the scrambled data when the GUI is not in the Bluetooth viewable range of the user authorized to view the data.

Systems, methods, and computer program products disclosed herein automatically scrambles and unscrambles data on a display screen of a computing device in which only an authenticated user is able to view the unscrambled data on the display screen using deciphering glasses. The computing device may generate instructions to scramble the data on the screen by changing a focus, which may be different for each authentication session between the computing device and the user (wearing the deciphering glasses). The screen depicts a border of what should have a different focus so that the user can maintain focus and depth perception when not looking at the screen. The deciphering glasses are further configured to focus on the screen based on parameters during a particular authentication session.

In some embodiments, a system may include a system database, a user computing device, and a wearable device.

The system database is hosted on one or more servers comprising a non-transitory machine readable storage medium. The system database is configured to store a record of credentials associated with one or more users and one or more wearable devices. The user computing device may include a screen configured to display an image comprising encrypted data that corresponds to displaying a plurality of segments of the image in a rearranged order such that the display of the encrypted data in the image is unreadable a human. The wearable device may include one or more lenses. The wearable device further comprises a processor configured to: wirelessly connect with the user computing device, wherein the user computing device connects to the wearable device, in response to the user computing device determining that a set of purported credentials associated with the wearable device received from the wearable device matches a set of credentials authenticating the wearable device that are stored in the system database; and display decrypted data on the one or more lenses of the wearable device such that the plurality of segments of the image are arranged to make the encrypted data in the image displayed on the one or more lenses readable to a user of the wearable device.

In some embodiments, a method may include displaying, by a user computing device, on a screen, an image comprising encrypted data that corresponds to a plurality of segments of the image that are rearranged such that the encrypted data in the image is unreadable to a human. The method may further include receiving, by the user computing device, a request for a wireless connection from to a wearable device comprising one or more lenses. The method may further include connecting, by the user computing device, to the wearable device, in response to the user computing device determining that a set of purported credentials associated with the wearable device received from the wearable device matches a set of credentials authenticating the wearable device that are stored in the system database. The method may further include transmitting, by the user computing device, decrypted data for display on the one or more lenses such that the plurality of segments of the image are arranged to make the encrypted data in the image displayed on the one or more lenses readable to a the human.

In some embodiments, a method may include displaying, by a user computing device, on a screen, an image comprising encrypted data that corresponds to a rearrangement of a plurality of segments representing the image based on an encryption method such that the encrypted data in the image is unreadable to a human. The method may further include capturing, by the user computing device, via one or more imaging sensors associated with the user computing device, a real-time facial image of a user adjacent to the user computing device. The method may further include tracking, by the user computing device, eye position of the user based on information retrieved from the real-time facial image of the user. The method may further include determining, by the user computing device, whether the user is authorized to view the encrypted data on the screen, in response to matching a set of purported identifications associated with the facial image received from the one or more imaging sensors with a set of identifications authenticating the user that is stored in a system database. The method may further include, in response to the set of purported identifications matching with the set of identifications and based on current eye position relative to the screen, decrypting, by the user computing device, the encrypted data displayed on the screen and displaying the plurality of segments of the image in an original arrangement before the encryption. The method may further include encrypting, by the user computing device, the decrypted data displayed on the screen into the encrypted data that is unreadable to the human, in response to movement of the eye position relative to the screen indicating that the user is not viewing the screen.

In some embodiments, a method may include displaying, by a user computer device, on a screen, an image comprising encrypted data that is unreadable to a human, wherein the encrypted data corresponds to a plurality of segments of the image that are configured such that the encrypted data in the image is unreadable to the human. The method may further include sensing, by the user computing device, via one or more sensors associated with the user computing device, at least a portion of a face of a user adjacent to the user computing device. The method may further include determining, by the user computing device, whether the user is authorized to view the encrypted data on the screen, in response to matching a set of purported identifications associated with the at least the portion of the face received from the one or more sensors with a set of identifications authenticating the user that is stored in a system database. The method may further include, in response to the set of purported identifications matching with the set of identifications, decrypting, by the user computing device, the encrypted data displayed on the screen such that the plurality of segments of the image are reconfigured and decrypted data in the image is readable.

In some embodiments, a method may include displaying, by a user computer device, on a screen, an image comprising encrypted data that is unreadable to a human, wherein the encrypted data corresponds to a plurality of segments of the image that are configured such that the encrypted data in the image is unreadable to the human. The method may further include capturing, by the user computing device, via one or more sensors associated with the user computing device, a real-time facial image of a first user adjacent to the user computing device. The method may further include determining, by the user computing device, whether the first user is authorized to view the encrypted data on the screen, in response to matching a set of purported identifications associated with the facial image of the first user received from the one or more sensors with a set of identifications authenticating the first user that is stored in a system database. The method may further include, in response to the set of purported identifications matching with the set of identifications, decrypting, by the user computing device, the encrypted data displayed on the screen such that the plurality of segments of the image are reconfigured and decrypted data in the image is readable to the first user. The method may further include detecting, by the user computing device, via the one or more sensors, a second user in line of sight of the screen. The method may further include converting, by the user computing device, the decrypted data displayed on the screen into the encrypted data that is unreadable to the human, in response to detection of a presence of the second user in line of sight of the screen.

In some embodiments, a method may include receiving, by a server, via one or more pulse sensors, pulse waveform data collected from one or more measurement positions of a known user while wearing a wearable device, wherein the one or more measurement positions comprises at least a temple pulse position and a wrist pulse position. The method may further include generating, by the server, a biometric pulse signature characterizing the pulse waveform data identifying the known user wearing the wearable device, wherein the biometric pulse signature associated with the known user wearing the wearable device is stored in a system database comprising a non-transitory machine readable storage medium configured to store a plurality of biometric pulse signatures associated with a plurality of known users. The method may further include receiving, by the server, via the one or more pulse sensors, pulse waveform data collected from the one or more measurement positions of a new user wearing the wearable device. The method may further include authenticating, by the server, the new user, in response to the server determining the pulse waveform data associated with the new user matches at least one biometric pulse signature of the plurality of biometric pulse signatures stored in the system database. The method may further include transmitting, by the server, instructions to a user computing device to convert scrambled data displayed on a screen of the user computing device into unscrambled data, wherein the unscrambled data is readable when the screen of the user computing device is viewed through one or more lenses of the wearable device by the new user.

In some embodiments, a system may include a system database hosted on one or more servers comprising a non-transitory machine readable storage medium, the system database configured to store a plurality of biometric pulse signatures associated with a plurality of known users; one or more pulse sensors is configured to collect pulse waveform data from one or more measurement positions of a known user wearing a wearable device, wherein the one or more measurement positions comprises at least a temple pulse position; and a server. The server is configured to receive the pulse waveform data of the known user from the one or more pulse sensors; generate a biometric pulse signature characterizing the pulse waveform data identifying the known user wearing the wearable device, wherein the biometric pulse signature associated with the known user wearing the wearable device is stored in the system database; receive from the one or more pulse sensors, pulse waveform data collected from the one or more measurement positions of a new user wearing the wearable device; authenticate the new user, in response to determining that the pulse waveform data associated with the new user matches at least one biometric pulse signature of the plurality of biometric pulse signatures stored in the system database; and transmit instructions to a user computing device to convert scrambled data displayed on a screen of the user computing device into unscrambled data, wherein the unscrambled data is readable when the screen of the user computing device is viewed through one or more lenses of the wearable device by the new user.

In some embodiments, a method may include receiving, by a server, via one or more pulse sensors, pulse waveform data collected from one or more measurement positions of a user while wearing a wearable device, wherein the one or more measurement positions comprises at least a temple pulse position. The method may further include generating, by the server, a biometric pulse signature characterizing the pulse waveform data identifying the user wearing the wearable device. The method may further include authenticating, by the server, the user, in response to the server determining the biometric pulse signature associated with the user matches at least one biometric pulse signature of a known user stored in a system database comprising a non-transitory machine readable storage medium configured to store a plurality of biometric pulse signatures associated with a plurality of known users. The method may further include, in response to authentication of the user, displaying, by the server, on a screen of a user computing device, data, wherein the data is readable when the screen of the user computing device is viewed through one or more lenses of the wearable device by the user. The method may further include detecting, by the server, via one or more motion sensors, a movement of at least the user or the wearable device relative to the user computing device. The method may further include, in response to detection of movement of the user beyond a pre-defined range, displaying, by the server, scrambled screen on the user computing device such that the data on the scrambled screen is not readable for the user.

In some embodiments, a system may include a system database hosted on one or more servers comprising a non-transitory machine readable storage medium. The system database is configured to store a record of credentials associated with one or more users and one or more wearable devices. The system may further include a user computing device comprising a screen configured to display an image comprising scrambled data that is unreadable to a human, wherein the scrambled data corresponds to arrangement of one or more fonts in text data of the image such that the text data become unreadable to the human. The system may further include a wearable device comprising one or more lenses, wherein the wearable device further comprises a processor configured to: wirelessly connect with the user computing device to generate a session, wherein the user computing device connects to the wearable device, in response to the user computing device determining that a set of purported credentials associated with the wearable device received from the wearable device matches a set of credentials authenticating the wearable device that are stored in the system database; adjust a focus value of the one or more lenses to synchronize with respect to readability of the screen, based on one or more attributes associated with the session, wherein the processor is configured to adjust the focus value of the one or more lenses for each new session based on one or more attributes associated with each new session; and display unscrambled data on the screen such that the one or more fonts in the image are readable when the screen of the user computing device is viewed through the one or more lenses with adjusted focus value.

In some embodiments, a method may include displaying, by a server, on a screen of a user computing device one or more pages, wherein each page comprising scrambled data that is unreadable to a human, and wherein the scrambled data corresponds to arrangement of one or more fonts in text data on each page that are configured such that the text data is unreadable to the human. The method may further include receiving, by the server, a request for a wireless connection from a wearable device comprising one or more lenses with the user computing device. The method may further include connecting, by the server, the user computing device to the wearable device to generate a session, in response to the server determining that a set of purported credentials associated with the wearable device received from the wearable device matches a set of credentials authenticating the wearable device that are stored in the system database. The method may further include adjusting, by the server, a focus value of the one or more lenses to synchronize with respect to readability of each page of the screen, based on one or more attributes associated with each page, wherein the server is configured to adjust the focus value of the one or more lenses for each new page based on one or more attributes associated with each new page. The method may further include displaying, by the server, unscrambled data on each page of the screen such that the text data in each page is readable when each page of the screen is viewed through the one or more lenses with adjusted focus value depending on the one or more attributes of corresponding page.

In some embodiments, a system may include a system database hosted on one or more servers comprising a non-transitory machine readable storage medium. The system database is configured to store a record of credentials associated with one or more users and one or more wearable devices. The system may further include a user computing device comprising a screen configured to display one or more pages, wherein each page comprising scrambled data that is unreadable to a human, and wherein the scrambled data corresponds to a plurality of segments of text data on each page that are configured such that the text data is unreadable to the human. The system may further include a wearable device comprising one or more lenses, wherein the wearable device further comprises a processor configured to: wirelessly connect with the user computing device to generate a session, wherein the user computing device connects to the wearable device, in response to the user computing device determining that a set of purported credentials associated with the wearable device received from the wearable device matches a set of credentials authenticating the wearable device that are stored in the system database; adjust a focus value of the one or more lenses to synchronize with respect to readability of each page of the screen, based on one or more attributes associated with each page, wherein the server is configured to adjust the focus value of the one or more lenses for each new page based on one or more attributes associated with each new page; and display unscrambled data on each page of the screen such that the text data in each page is readable when each page of the screen is viewed through the one or more lenses with adjusted focus value depending on the one or more attributes of corresponding page.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments that, together with the specification, explain the subject matter.

FIG. 11 shows execution of a method showing operations of a distributed data processing and display system, according to an exemplary embodiment.

FIG. 12 shows execution of a method showing operations of a distributed data processing and display system, according to an exemplary embodiment.

DETAILED DESCRIPTION

Figure 1:
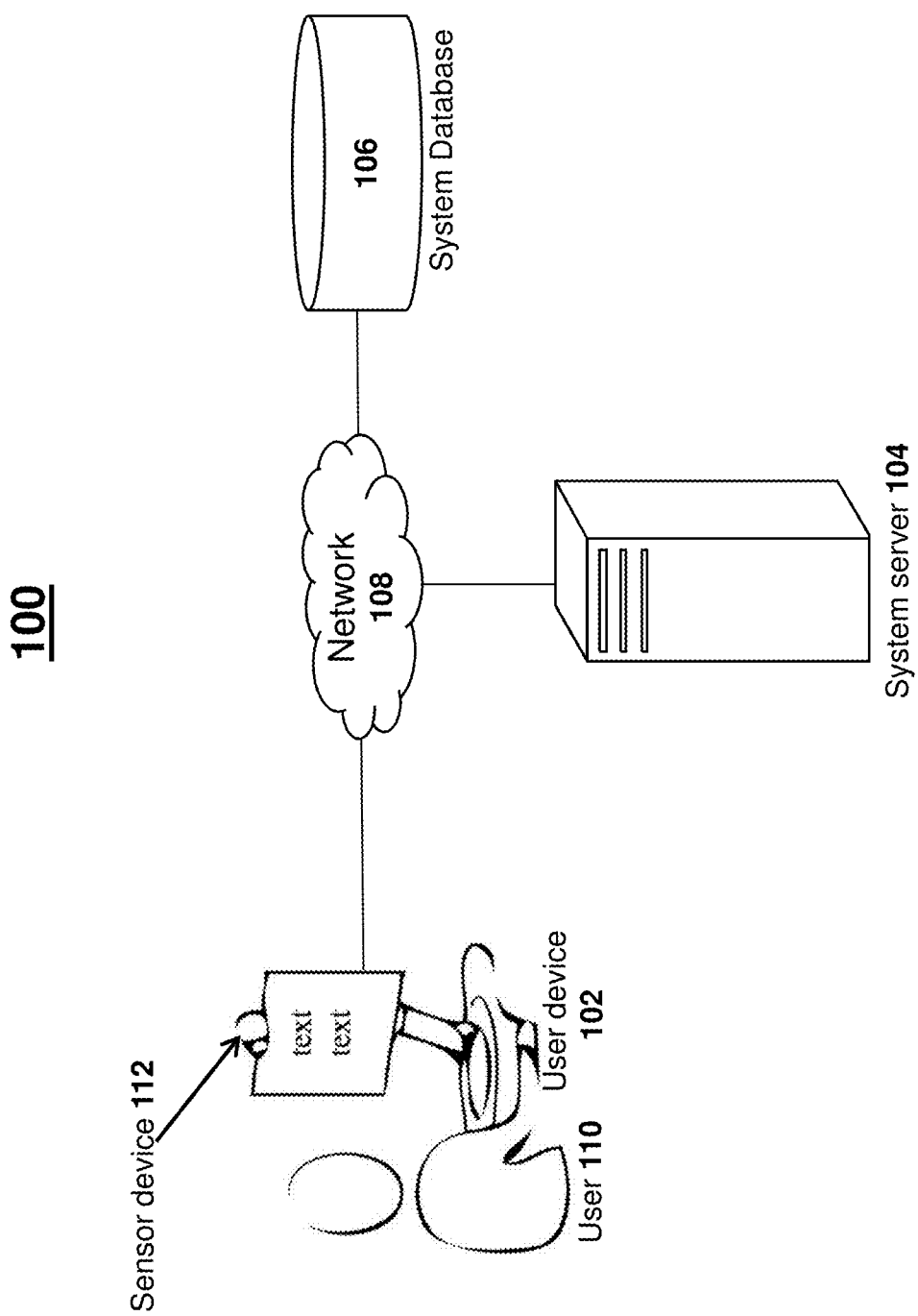
FIG. 1 illustrates components of a distributed data processing and display system, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein.

The present disclosure is described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 shows components of a distributed data processing and display system 100. The system 100 may include user devices 102, system servers 104, and system databases 106. The user devices 102, the system servers 104, and the system databases 106 are connected to each other through a network 108. The examples of the network 108 may include, but are not limited to, private or public LAN, WLAN, MAN, WAN, and Internet. The network 108 may include both wired and wireless communications according to one or more standards and/or via one or more transport mediums. The communication over the network 108 between the user devices 102, the system servers 104, and the system databases 106 may be performed in accordance with various communication protocols such as Transmission Control Protocol and Internet Protocol (TCP/IP), User Datagram Protocol (UDP), and IEEE communication protocols. In one example, the network 108 may include wireless communications according to Bluetooth specification sets, or another standard or proprietary wireless communication protocol. In another example, the network 108 may also include communications over a cellular network, including, e.g., a GSM (Global System for Mobile Communications), CDMA (Code Division Multiple Access), and EDGE (Enhanced Data for Global Evolution) network.

User devices 102 may be any computing and/or telecommunications device comprising a processor and capable of performing the various tasks and processes described herein, such as accessing a webserver and providing a GUI interface to a user to interact with a website and sensitive data hosted on the webserver. Non-limiting examples of the user device 102 may include a user computer (e.g., desktop, laptop, server, tablet), a telephone (e.g., smartphone), or any other telecommunications or computing device used to interact with various web services. For ease of explanation, FIG. 1 shows a single computer device functioning as the user device 102. However, it should be appreciated that some embodiments may comprise any number of computing devices capable of performing the various tasks described herein.

The user device 102 may be any computer allowing a user 110 to interact with a system server 104 via the webserver to access sensitive data. The user device 102 may execute an Internet browser or a local software browser application that access the webserver in order to issue requests or instructions to the system server 104 to access various components of the system 100. The user device 102 may transmit credentials from inputs (user identification and/or authorization data) of the user 110 to the webserver, from which the webserver may authenticate the user 110. One having skill in the art would appreciate that the user device 102 may comprise any number of input devices configured to receive any number of data inputs (e.g., mouse, keyboard, touchscreen, stylus), including various types of data inputs allowing for authentication, e.g., username, passwords, certificates, biometrics. One having skill in the art would also appreciate that the user device 102 may be any personal computer (PC) comprising a processor and non-transitory machine-readable storage medium allowing the user device 102 to perform the various tasks and processes described herein.

The user device 102 may include one or more transmitter devices (transmitters) and one or more receiver devices (receivers). The transmitter may transmit or broadcast signals to the receiver. The transmitter and the receiver may be permanently integrated into the user device 102, or the transmitter and the receiver may be detachably coupled to the user device 102, which, in some cases, may result in a single integrated product or unit. As an example, the user device 102 may be placed into a protective sleeve comprising embedded transmitter and receiver that are detachably coupled to the user device 102 power supply input. Non-limiting examples of the integrated user device 102 may include laptops, tablets, among other types of the user device 102. The user device 102 may further include embedded or associated cameras, sensors 112 (such as proximity sensors, image sensors, motion sensors, thermal sensors, and ambient light sensors), accelerometers, compasses, and/or gyroscopes, which may act as a data source for the transmitter to supplement data, as generated by various electronic devices physically associated with the transmitter.

A transmitter may include or be associated with a processor, a communications component, and a sensor device/sensor 112. The processor may control, manage, and otherwise govern the various processes, functions, and components of the transmitter. The processor may be configured to process and communicate various types of data (e.g., sensor and camera data). Additionally or alternatively, the processor of the transmitter may manage execution of various processes and functions of the transmitter, and may manage the components of the transmitter. For example, the processor may determine an interval at which a signal (such as Bluetooth or Infrared) may be broadcast by the communications component, to identify receivers (such as Bluetooth receiver) of a wearable device 200 (as shown in the FIG. 2). In some cases, a single transmitter may comprise a single processor. However, it should be appreciated that, in some cases, a single processor may control and govern multiple transmitters. For example, the transmitters may be coupled to a system server 104 comprising a processor that executes software modules instructing the processor of the system server 104 to function as a transmitter processor capable of controlling the behavior of the various transmitters. Additionally or alternatively, a single transmitter may comprise multiple processors configured to execute or control specified aspects of the transmitter's behavior and components. For example, the transmitter may comprise a transmitter processor and a sensor processor, where the sensor processor is configured to manage a sensor and a camera, and generate sensor data and camera data, and where the transmitter processor is configured to manage the remaining functions of the transmitter.

Figure 2:
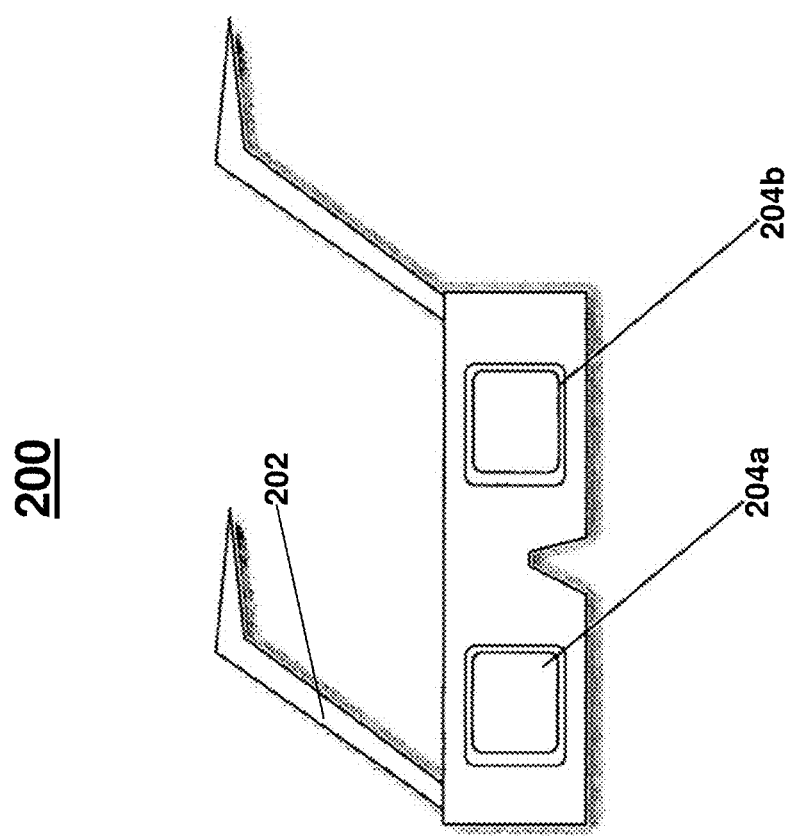
FIG. 2 illustrates a wearable device for an authorized viewing of sensitive data, according to an exemplary embodiment.

A communications component of a transmitter may effectuate wired and/or wireless communications to and from receivers of a wearable device 200 (as shown in the FIG. 2). In some cases, the communications component may be an embedded component of the transmitter; and, in some cases, the communications component may be attached to the transmitter through any wired or wireless communications medium. In some embodiments, the communications component may be shared among a plurality of transmitters, such that each of the transmitters coupled to the communications component may use the data received within a communications signal, by the communications component.

The communications component may comprise electro-mechanical components (e.g., processor) that allow the communications component to communicate various types of data with one or more receivers of a wearable device 200 (as shown in the FIG. 2), transmitters of the wearable device 200, and/or other components of the transmitter via communications signals. In some implementations, these communications signals may represent a distinct channel for hosting communications, independent from the sensor wave communication. The data may be communicated using the communications signals, based on predetermined wired or wireless protocols and associated hardware and software technology. The communications component of the transmitter may operate based on any number of communication protocols, such as Bluetooth®, Wireless Fidelity (Wi-Fi), Near-Field Communications (NFC), ZigBee, and others. However, it should be appreciated that the communications component of the transmitter is not limited to radio-frequency based technologies, but may include radar, infrared, and sound devices for sonic triangulation of any receiver.

Using a communications signal, the transmitter may communicate data that may be used, e.g., to identify receivers of a wearable device 200 (as shown in the FIG. 2), determine whether users 110 are authorized to access sensitive data, determine whether the user 110 wearing the wearable device 200 is authorized to access sensitive data, among other possible functions. Similarly, a communications component of a receiver of the wearable device 200 may use a communications signal to communicate data that may be used to, e.g., alert transmitters of a user device 102 that the receiver has entered or is about to enter a communication/transmission field of the transmitter. As an example, the communications component of the transmitter may communicate (i.e., send and receive) different types of data (e.g., authentication and identification data) containing various types of information. Non-limiting examples of the information may include a transmitter identifier (TX ID), a user device identifier (device ID) for the user device 102, a user identifier (user ID) of the user 110, the receiver's location in the communication field, the user device 102 location in the communication field, and other such information.

A sensor (such as an imaging sensor or a camera) 112 may be physically associated with a transmitter and/or a user device 102 (i.e., connected to, or a component of). The sensor 112 may be configured to detect and identify various conditions of the system 100 and/or communication field, and a location and position of a user 102 with respect to a user device 102. Sensor 112 is configured to generate sensor data (such as digital images), which may then be used by the user device 102 to determine various modes of operation. As detailed herein, the sensors 112 may transmit the sensor data collected during the sensor operations for subsequent processing by a transmitter processor of the transmitter and/or a processor of the user device 102. Additionally or alternatively, one or more sensor processors may be connected to or housed within the sensor 112. The sensor processors may comprise a microprocessor that executes various primary data processing routines, whereby the sensor data received at the transmitter processor or processor of the user device 102 has been partially or completely pre-processed as useable data for scrambling or unscrambling a screen and/or content displayed on the screen of the user device 102. Hereinafter, the term "scrambling" and "encrypting" may be interchangeably used. Also, the term "unscrambling" and "decrypting" may be interchangeably used. In some configurations, the sensor device 112 may be a part of (e.g., communicatively coupled with) the user device 102. For instance, the sensor device 112 may be an internal camera device installed and executing on the user device 102 such as a laptop device. The system server 104 may identify that the user device 102 comprises a camera and activate the camera in order to receive sensory data from the sensor device 112.

A user device 102 or a system server 104 may generate instructions or execute a scrambling algorithm/software program to scramble or unscramble content on screen of the user device 102. In some embodiments, the user device 102 or the system server 104 may generate the instructions or execute the scrambling algorithm/software program to scramble or unscramble the screen of the user device 102. The execution and/or implementation of the scrambling algorithm/software program results in the image (containing text data) displayed on the screen having jumbled graphical components (e.g., text elements). For instance, a scrambled text may comprise misplaced text characters (e.g., alphabet).

In some embodiments, the execution and/or implementation of the scrambling algorithm/software program results in the image (containing text or visual data) displayed on the screen being divided into multiple segments. The segments may be squares, which can be tiled together to form the image. However, in some configurations, other types of segments can be formed out of other geometric shapes such as triangles and hexagons or any pre-determined shape not conforming to traditional geometric shapes. In some embodiments, the system server 104 may divide the display screen into a pre-determined number of segments of same or different sizes, for example, X×Y segments displaying unscrambled segmented text 312 (as shown in the FIG. 3C). The system server 104 may then invert each of the screen segments displaying scrambled segmented text 314 (as shown in the FIG. 3D) where each segmented text 314 may be of different size so that when viewed by an unauthorized person, the content display screen in not readily identifiable. In some configurations, only when viewed through a wearable device 200 (as shown in the FIG. 2) having a lens 204 of corresponding X×Y configuration, the images will be seen in their original orientation.

When lens unit 204 of a wearable device 200 (as shown in the FIG. 2) are placed together, the unscrambled image may then be formed on the side of the lens. In this manner, only the user 110 who wears the eyeglasses is able to view the unscrambled image on the screen of the user device 102, and to all other individuals, the screen of the user device 102 appears to be a distorted compilation of individual texts (i.e., scrambled screen).

In some embodiments, execution and/or implementation of the scrambling algorithm/software program results in inversion of the multiple segments displaying scrambled segmented text 314 (as shown in the FIG. 3D) on the screen of the user device 102. In some embodiments, execution and/or implementation of the scrambling algorithm/software program results in scrambling of pixels 316, 318 on the screen of the user device 102 (as shown in the FIG. 3E and FIG. 3F) on the screen of the user device 102. In some embodiments, the execution and/or implementation of the scrambling algorithm/software program results in making the multiple segment appear backwards, making the multiple segments appear smaller than its regular size, and rotating the multiple segments about a central point. Various other methods in which a screen and/or an image (containing text or visual data) on the screen of the user device 102 may be distorted so that a specific lens of a wearable device 200 can correct the distortion and make the content displayed on the screen readable. The arrangement of the distorted multiple segments is such that the compilation of the individual distorted multiple segments is sufficiently different from the original content image and prevents unauthorized users from comprehending the content image on the screen of the user device 102.

In some embodiments, a sensor 112 associated with user device 102 may transmit sensor data to the system server 104 via the user device 102. Although described in the exemplary embodiment as raw sensor data, it is intended that the sensor data is not limited to raw sensor data and can include data that is processed by a processor associated with the sensor 112, processed by a processor associated with the user device 102, processed by a processor associated with the system server 104, or any other processor. The sensor data can include information derived from the sensor 112 of the user device 102, and processed sensor data can include determinations based upon the sensor data. For example, a gyroscope of a receiver of a wearable device 200 (as shown in the FIG. 2) may provide data such as an orientation in X-plane, Y-plane, and Z planes, and processed data from the gyroscope may include a determination of the location of the receiver based upon the orientation of the receiver. In another example, data from an infrared sensor of the transmitter may provide thermal imaging information, and processed data may include an identification of the user 110 based upon the thermal imaging information. As used herein, any reference to the sensor data or the raw sensor data can include data processed at the sensor 112, the imaging device, or other device. In some implementations, a gyroscope and/or an accelerometer of the receiver of the wearable device 200 or the user device 102 associated with the receiver may provide sensor data indicating the orientation of the user 110 of the wearable device 200 or user device 102 with respect to the user 110, which the user device 102 or the system server 104 may use to determine whether to scramble or unscramble screen and/or content on screen of the user device 102.

A user device 102 or a system server 104 may make a determination to whether scramble or unscramble a screen and/or an image (containing text or video data) on the screen of the user device 102 based on sensor and/or camera data obtained from the sensor (such as imaging sensor (camera) or other sensor) 112 directly or indirectly associated with the user device 102 and/or the system server 104. If the user device 102 and/or the system server 104 chooses to unscramble the screen and/or the image on the screen of the user device 102 based on the sensor and/or camera data, then each screen and/or image segment is returned to its original orientation and the unscrambled screen and/or image will be visible on the screen of the user device 102. If the user device 102 and/or the system server 104 unscrambles the screen and/or the image based on the sensor data (or after the screen and/or the image segments have been returned to their original orientation) a determination is made by the user device 102 and/or the system server 104 as to whether the execution of the scrambling algorithm/software program is to be stopped.

In some configurations, if the user device 102 and/or the system server 104 terminates the execution of the scrambling algorithm/software program, then a determination is made by the user device 102 and/or the system server 104 on whether to change the configuration of the screen and/or image segments. In some configurations, the user 110 may be able to terminate the scrambling of the display screen.

In some cases, a receiver may be embedded or attached to a wearable device 200 (as shown in the FIG. 2) comprising a gyroscope and/or an accelerometer that generates data indicating an orientation of the wearable device 200. The receiver may transmit the data to a processor of a user device 102, via communications signals or waveforms. In such implementations, the processor may not scramble a screen and/or an image on the screen of the user device 102 until the processor receives, via communication waves, the data produced by the gyroscope and/or accelerometer, indicating that the receiver or the wearable device 200 is in motion or has an orientation suggesting that the wearable device 200 is in use.

As an example, a receiver may be attached to or embedded within eyeglasses, which may include a gyroscope and an accelerometer. In this example, while the eyeglasses are being utilized by the user 110, a processor of the user device 102 and/or the system server 104 may present unscrambled content on the screen of the user device 102. But when the user 110 lifts the eyeglasses from his or her face, the accelerometer then generates data indicating that the eyeglasses is in motion and the gyroscope generates the data indicating that the eyeglasses has a planar-orientation indicating that the eyeglasses is not against the user 110's face. The processor of the user device 102 and/or the system server 104 may then determine from the data produced by the gyroscope and accelerometer that the eyeglasses is not against the user 110 face, and thus the processor of the user device 102 and/or the system server 104 scrambles the screen and/or the content on the screen of the user device 102. The processor of the user device 102 and/or the system server 104 may make this determination according to any number of preset threshold values regarding data produced by gyroscopes and/or accelerometers.

A sensor 112 directly or indirectly associated with a user device 102 and/or a system server 104 may be a device configured to emit sensor waves, which may be any type of wave that may be used to identify a user 110 in a transmission field of the sensor 112. Non-limiting examples of the sensor technologies for the sensors 112 may include: infrared/pyro-electric, ultrasonic, laser, optical, Doppler, accelerometer, microwave, millimeter, face recognition, head movement, motion, imaging, and radio frequency standing-wave sensors. Other sensor technologies that may be well-suited to secondary and/or proximity-detection sensors may include resonant LC sensors, capacitive sensors, and inductive sensors. Based upon the particular type of the sensor waves used and the particular protocols associated with the sensor waves, the sensor 112 may generate sensor data. In some cases, the sensor 112 may include a sensor processor that may receive, interpret, and process sensor data, which the sensor 112 may then provide to a processor of the user device 102 and/or the system server 104.

A sensor 112 directly or indirectly associated with a user device 102 and/or a system server 104 may be a passive sensor, an active sensor, and/or a smart sensor. Passive sensors, such as tuned LC sensors (resonant, capacitive, or inductive) are a type of sensor 112 and may provide minimal but efficient object discrimination. The passive sensors may be used as secondary (remote) sensors that may be dispersed into a communication field and may be part of a receiver or otherwise independently capture raw sensor data that may be wirelessly communicated a sensor processor. Active sensors, such as infrared (IR) or pyro-electric sensors, may provide efficient and effective target discrimination and may have minimal processing associated with the sensor data produced by such active sensors. Smart sensors may be sensors having on-board digital signal processing (DSP) for primary sensor data (e.g., prior to processing by a processor of the user device 102 and/or the system server 104). The processors are capable of fine, granular object (such as user 110) discrimination and provide processors of the user device 102 and/or the system server 104 with pre-processed sensor data that is more efficiently handled by the processor when determining when to scramble and unscramble the screen and/or content on the screen of the user device 102.

A sensor 112 directly or indirectly associated with a user device 102 and/or a system server 104 may have a capability to operate and generate different types of sensor data, and may generate location-related information of a user 110 in various formats. Active and smart sensors may be categorized by sensor type, characteristic hardware and software requirements, and capabilities for distance calculation and motion detection of the user 110.

In some implementations, sensors 112 associated with a user device 102 may be configured for the user 110 recognition, and thus may discriminate the user 110 from other objects, such as furniture. Non-limiting examples of the sensor data processed by human recognition-enabled sensors may include: body temperature data, infrared range-finder data, motion data, activity recognition data, silhouette detection and recognition data, gesture data, heart rate data, portable devices data, and wearable device data (e.g., biometric readings and output, accelerometer data). In some embodiments, the sensors 112 associated with the user device 102 may be configured for a particular user 110 (for example, a first user) recognition, and thus may discriminate the first user from other users, such as a second user and a third user. The sensors 112 may recognize the first user based on one or more of body temperature data associated with the first user, infrared range-finder data associated with the first user, motion data associated with the first user, activity recognition data associated with the first user, silhouette detection and recognition data associated with the first user, gesture data associated with the first user, heart rate data associated with the first user, portable devices data associated with the first user, or wearable device data (e.g., biometric readings and output, accelerometer data) associated with the first user.

In operation, sensors 112 directly or indirectly associated with a user device 102 and/or a system server 104 may detect whether objects, such as a user 110 (authorized or unauthorized user), enter a predetermined proximity (of a transmitter) of the user device 102. In one configuration, the sensor 112 may then instruct a processor of the user device 102 and/or the system server 104 to execute various actions such as scrambling or unscrambling a screen and/or content on the screen of the user device 102 based upon the detected objects such as the user 110 (authorized or unauthorized user). In another configuration, the sensor 112 may transmit sensor data to the user device 102 and/or the system server 104, and the user device 102 and/or the system server 104 may determine which actions to execute.

For example, after the sensor 112 identifies that the user 110 has entered a pre-defined communication field (for example, a Bluetooth or NFC field) of the user device 102, and the user device 102 and/or the system server 104 determines that the user 110 is within the predetermined proximity (for example, a predetermined distance of 5 to 10 meters) of the user device 102 based on the sensor data, the sensor 112 could provide the relevant sensor data to the user device 102 and/or the system server 104, causing the user device 102 and/or the system server 104 to scramble or unscramble screen and/or content on the screen of the user device 102. As another example, after identifying the user 110 entering the field and then determining that the user 110 has come within the predetermined proximity of the user device 102 based on the sensor data, the sensor 112 may provide the sensor data to the user device 102 and/or the system server 104 that causes the user device 102 and/or the system server 104 to scramble or unscramble screen and/or content on the screen of the user device 102.

In another example, the system 100 may comprise an alarm device (not shown), which may produce a warning, and/or may generate and transmit a digital message to the system server 104 and/or an administrative computing device (not shown) configured to administer operations of the system 100. In this example, after the sensor 112 detects the user 110 entering the predetermined proximity of the user device 102, or otherwise detects other unsafe or prohibited conditions of the system 100, the sensor data may be generated and transmitted to a processor of the alarm device, which may activate the warning, and/or generate and transmit a notification to the system server 104 or the administrator device. A warning produced by the alarm device may comprise any type of sensory feedback, such as audio feedback, visual feedback, haptic feedback, or some combination.

In some embodiments, such as the exemplary system 100, a sensor 112 may be a component of a user device 102, housed within the user device 102. In some embodiments, a sensor 112 may be external to the user device 102 and may communicate, over a wired or wireless connection, sensor data to one or more processors of the user device 102. A sensor 112, which may be external to the user device 102 or part of a single user device 102, may provide sensor data to the one or more processors, and the processors may then use the sensor data to scramble or unscramble screen and/or content on the screen of the user device 102. Similarly, in some embodiments, multiple sensors 112 may share sensor data with multiple processors. In such embodiments, sensors 112 or user device 102 may send and receive sensor data with other sensors (for example, sensors associated with wearable device) in the system 100. Additionally or alternatively, the sensors 112 and/or the user device 102 may transmit or retrieve sensor data, to or from one or more memories.

Figure 3B:
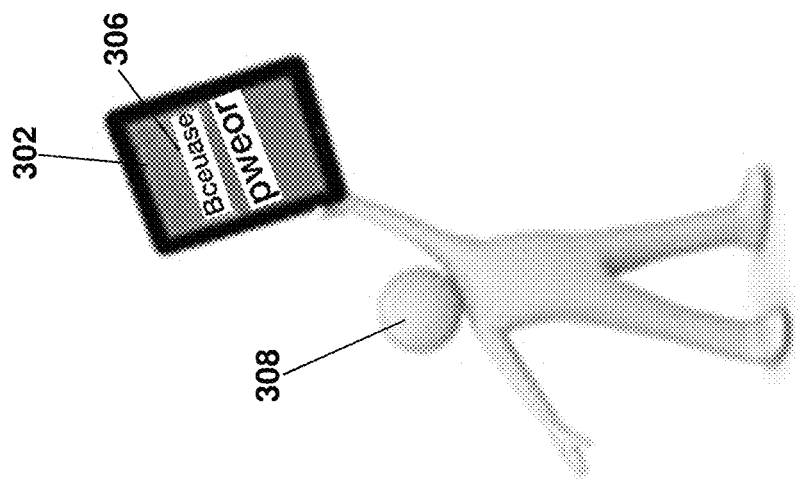
FIG. 3B illustrates a user computing device displaying scrambled text based on a second position of a user, according to an exemplary embodiment.
Figure 3A:
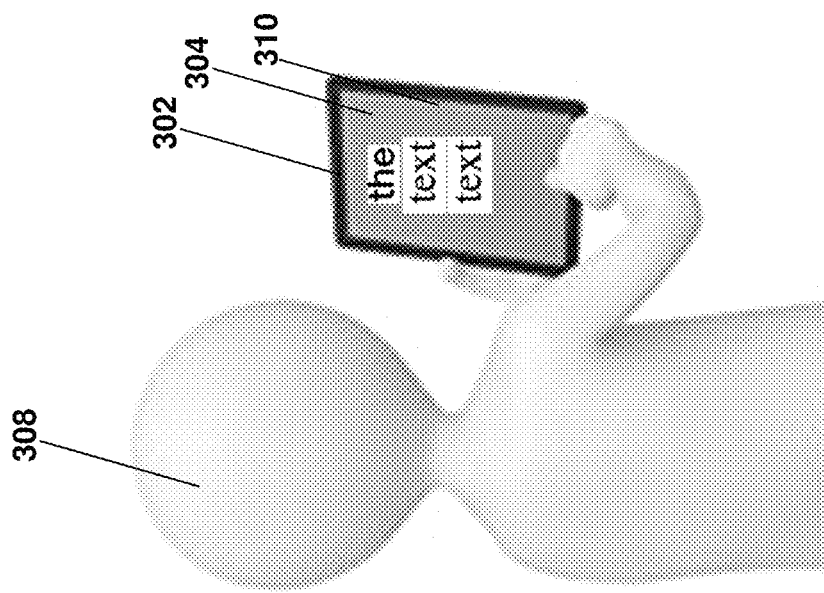
FIG. 3A illustrates a user computing device displaying unscrambled text based on a first position of a user, according to an exemplary embodiment.
Figure 3D:
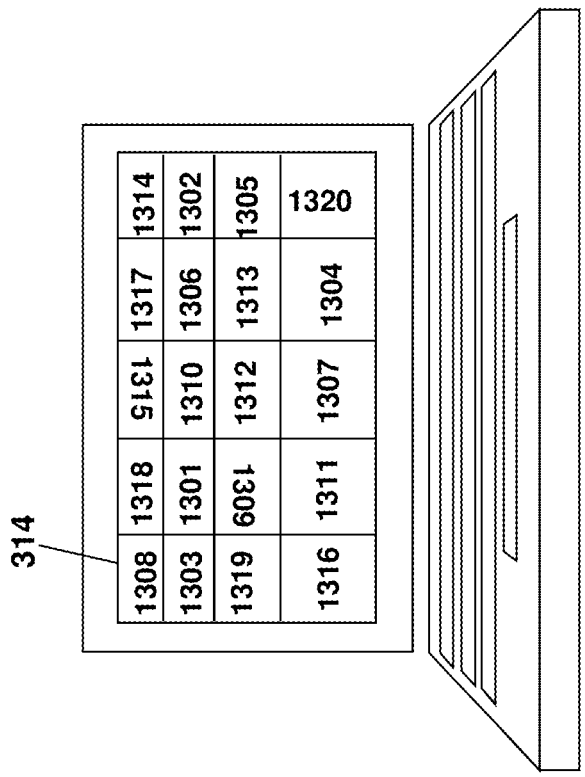
FIG. 3D illustrates a user computing device displaying scrambled text on a screen, according to an exemplary embodiment.
Figure 3C:
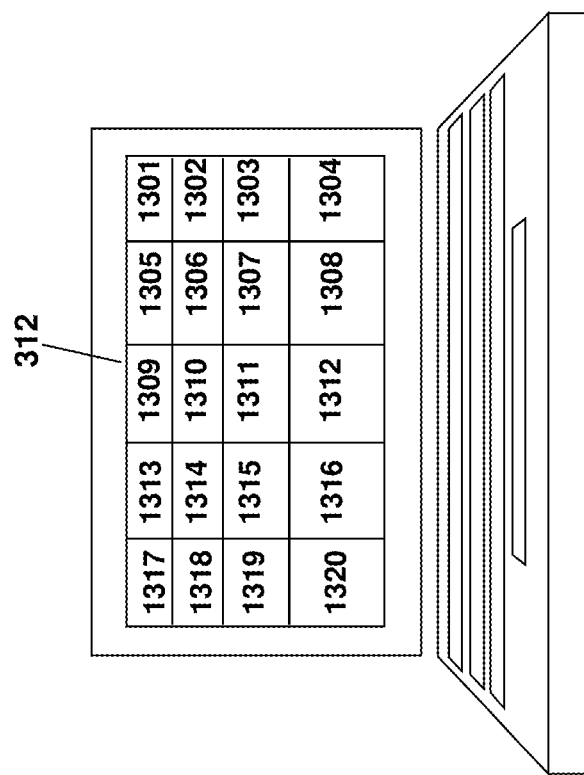
FIG. 3C illustrates a user computing device displaying unscrambled text on a screen, according to an exemplary embodiment.
Figure 3F:
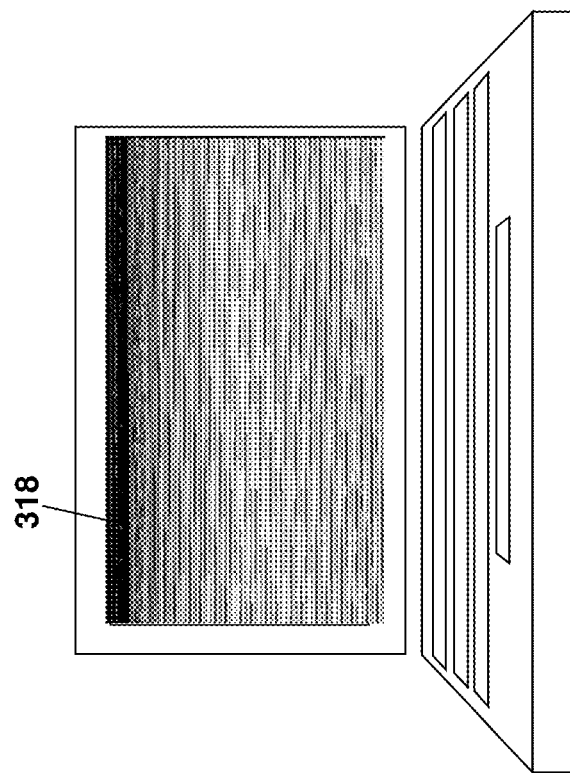
FIG. 3F illustrates a user computing device displaying scrambled text on a screen, according to an exemplary embodiment.
Figure 3E:
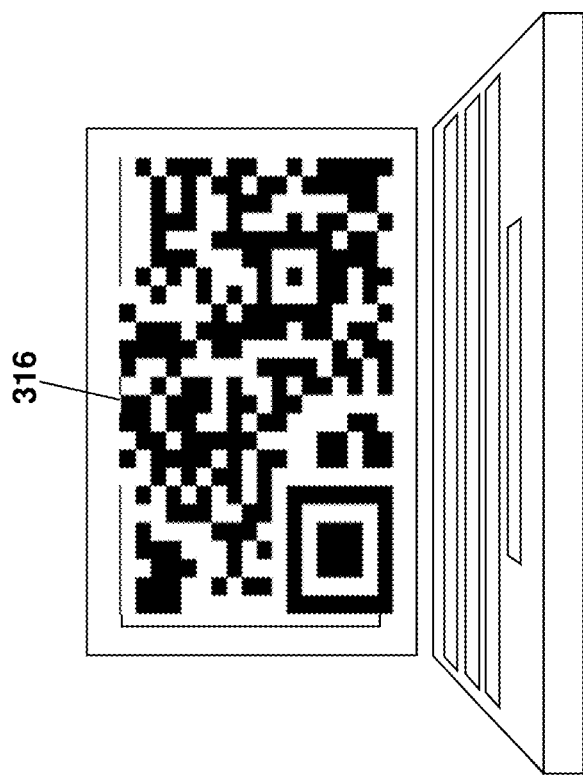
FIG. 3E illustrates a user computing device displaying scrambled text on a screen, according to an exemplary embodiment.

As an example, as seen in FIG. 3A and FIG. 3B, a first user device 302 may include a first sensor (now shown) that emits sensor waves and generates sensor data, which may be stored on the first user device 302 and/or a mapping memory. In this example, the user device 302 may comprise processors that may receive sensor data (such as captured images) from the sensors (such as cameras), and/or fetch stored sensor data from particular storage locations; thus, the sensor data produced by the respective sensor may be shared among the respective user device 302.

The processors of the user device 302 may then use the sensor data, to scramble or unscramble screen and/or content (text or visual data) on the screen of the user device 302 when a sensitive object (such as a user 308) is detected. For instance, a processor of the user device 302 may display unscrambled content 304 on the screen of the user device 302 when, based on the processed and analyzed sensor data, the sensitive object, e.g., user 308, is detected to be viewing the screen, the processor of the user device 302 may display scrambled content 306 on the screen of the user device 302. In some configurations, the system server 104 may scramble and other unscrambled display of data when the sensitive object (such as the user 308) is detected to be located away from the screen based on the processed and analyzed sensor data. For instance, when the user 308 walks away his or her computing device, the system server 104 may scramble the display of data.

Referring back to FIG. 1, a user device 102 may also include, or otherwise be associated with, multiple sensors 112 from which the user device 102 may receive sensor data. As an example, the user device 102 may include a first sensor located at a first position of the user device 102 and a second sensor located at a second position on the user device 102. In such an embodiment, the sensors 112 may be imaging or binary sensors that may acquire stereoscopic sensor data, such as the location of the user 110 relative to the first and the second sensors. In some embodiments, such binary or stereoscopic sensors may be configured to provide three-dimensional imaging capabilities, which may be transmitted to the user device 102, an administrator's workstation and/or a system server 104. In addition, binary and stereoscopic sensors may improve the accuracy of a receiver of a wearable device or user 110 location detection and displacement, which is useful, for example, in motion recognition and tracking.

In some implementations, a sensor 112 of a user device 102 may detect a user 110 within a sensor field of operation (for example, a range within which the sensor 112 may operate) that have been predetermined or tagged. In some cases, it may be desirable to avoid particular obstacles in the field, such as furniture or walls, regardless of whether a sensor 112 has identified a user 110, entering within proximity to a particular obstacle. As such, an internal or external mapping memory may store mapping data and/or sensor 112 identifying the particular location of the particular obstacle, thereby effectively tagging the location of the particular location as being off-limits. Additionally or alternatively, the particular user 110 may be digitally or physically associated with a digital or physical tag that produces a signal or physical manifestation detectable by the sensor 112, communications components, or other component of the user device 102. For example, as part of generating sensor data for the user device 102, the sensor 112 may access an internal mapping memory (i.e., internal to the user device 102 housing the sensor) that stores records of tagged obstacles to avoid, such as a table.

Additionally or alternatively, in some implementations, a sensor 112 may detect a user 110 who has been tagged (i.e., previously recorded in an internal mapping memory or external mapping memory or received a digital or physical tag detectable by the sensors 112). Under these circumstances, after detecting a tag or tagged user 110, or otherwise determining that a tag or tagged user 110 is within a field, the sensor 112 may generate sensor data that causes the user device 102 to switch from scrambled screen (scrambled content on the screen) to unscramble screen (unscrambled content on the screen) or vice-versa.

User device 102 may include an antenna array, which may be a set of one or more antennas configured to transmit and receive one or more signals (for example, identification data signals) from a receiver (in a wearable device). In some embodiments, an antenna array may include antenna elements, which may be configurable tiles comprising an antenna, and zero or more integrated circuits controlling the behavior of the antenna in that element, such as having predetermined characteristics (e.g., amplitude, frequency, trajectory, phase). An antenna of the antenna array may transmit a series of signals having the predetermined characteristics, such that the series of signals arrive at a given location within a field, and exhibit those characteristics.

In some embodiments, a user device 102 may include receivers (along with transmitters), which may be an electrical device coupled to or integrated with the user device 102. A receiver may comprise one or more antennas that may receive communication signals from (a transmitter of) a wearable device 200 (as shown in FIG. 2). The receiver may receive the communication signals produced by and transmitted directly from the transmitter. The receiver directly or indirectly associated with the user device 102 may include a receiver-side communications component, which may communicate various types of data with a transmitter of a wearable device 200 (as shown in FIG. 2) in real-time or near real-time, through a communications signal generated by the receiver's communications component. The data may include mapping data, such as device status data, status information for the receiver, status information for the user device 102. In other words, the receiver may provide information to the transmitter regarding a current location information of the user device 102 and certain user identification information, among other types of information.

As mentioned, in some implementations, a receiver may be integrated into a user device 102, such that for all practical purposes, the receiver and the user device 102 would be understood to be a single unit or product, whereas in some embodiments, the receiver may be coupled to the user device 102 after production. It should be appreciated that the receiver may be configured to use the communications component of the user device 102 and/or comprise a communications component of its own. As an example, the receiver might be an attachable but distinct unit or product that may be connected to the user device 102, to provide benefits to the user device 102. In this example, the receiver may comprise its own communications component to communicate data with transmitters of a wearable device 200 (as shown in FIG. 2). Additionally or alternatively, in some embodiments, the receiver may utilize or otherwise operate with the communications component of the user device 102. For example, the receiver may be integrated into a laptop computer during manufacturing of the laptop or at some later time. In this example, the receiver may use the laptop's communication component (e.g., Bluetooth®-based communications component) to communicate data with transmitters of a wearable device 200.

A system server 104 may function as an interface for an administrator to set configuration settings or provide operational instructions to various components of a system 100. The system server 104 may be any device comprising a communications component capable of wired or wireless communication with components of the system 100 and a microprocessor configured to transmit certain types of data to components of the system 100. Non-limiting examples of the system server 104 may include a desktop computer, a server computer, a laptop computer, a tablet computer, and the like. For ease of explanation, FIG. 1 shows a single computer device functioning as the system server 104. However, it should be appreciated that some embodiments may comprise any number of computing devices capable of performing the various tasks described herein.

A system server 104 may be a device that may comprise a processor configured to execute various routines for tagging a receiver in a wearable device 200 (as shown in FIG. 2) and a user device 102, based upon a type of a technology employed. As mentioned herein, tagging receivers and other users 110 within a field may indicate to components of the system 100 that those components should or should not execute certain routines. As an example, the system server 104 may be a laser guidance device that transmits tagging data to a transmitter communication component of the user device 102, sensor 112 of the user device 102, mapping memory, or other device of the system 100 that is configured to receive and process the laser guidance-based tagging data. In this example, the tagging data may be generated whenever a user 110 interacts with an interface input, such as a push button on the wearable device 200 or graphical user interface (GUI) on the user device 102, and a laser "tags" the desired user 110. In some cases, the resulting tagging data is immediately transmitted to the transmitter or other device for storage into mapping data. In some cases, a sensor 112 having laser-sensitive technology may identify and detect the laser-based tag. Although additional and alternative means of tagging objects such as users 110 and devices are described herein, one having ordinary skill in the art would appreciate that there are any number of guidance technologies that may be employed to tag a user 110 and generate or detect tagging data.

A system server 104 may execute a software application associated with a system 100, where the software application may include one or more software modules for generating and transmitting tagging data to various components of the system 100. The tagging data may contain information useful for identifying the users 110 or current locations of the users 110. That is, the tagging data may be used to instruct a sensor 112 that, when a particular sensory signature (e.g., infrared) is detected, the sensor 112 should generate certain sensor data, which would eventually inform the user device 102 whether to scramble or unscramble screen and/or content on the screen of the user device 102.

A system server 104 may be a server computer or other workstation computer that is directly or indirectly connected to a user device 102. In such implementations, an administrator may provide tagging data directly to an external mapping memory 117, which may be stored until needed by the user device 102. Although FIG. 1 shows the system server 104 as being a distinct device from the user device 102, it should be appreciated that they may be the same devices and may function similarly. In other words, the user device 102 may function as the system server 104; and/or the system server 104 may receive instructions through associated transmitters or receivers, embedded or coupled to the system server 104.

User device 102 may further be associated with one or more mapping-memories, which may be non-transitory machine-readable storage media configured to store mapping data, and which may be data describing aspects of fields associated with processors and sensors of the user device 102. The mapping data may comprise processor data, camera data, location data, and sensor data. The sensor data may be generated by sensor processors to identify users 110 located in a field of a sensor 112. Thus, sensor data stored in a mapping memory of the system 100 may include information indicating location of a receiver of a wearable device 200 (as shown in FIG. 2), location of the users 110, and other types of data, which can be used by a processor of the user device 102 and/or the system server 104 to scramble and unscramble screen and/or content on the screen of the user device 102. The user device 102 and/or the system server 104 may query the mapping data stored in the records of a mapping memory, or the records may be pushed to the user device 102 and/or the system server 104 in real-time, so that the user device 102 and/or the system server 104 may use the mapping data as input parameters for determining whether to execute programs to scramble and unscramble screen and/or content on the screen of the user device 102. In some implementations, the user device 102 and/or the system server 104 may update the mapping data of a mapping memory as new, up-to-date mapping data is received, from the processors governing the communications components or sensors 112.

A user device 102 may comprise non-transitory machine-readable storage media configured to host an internal mapping memory, which may store mapping data within the user device 102. A processor of the user device 102, such as a transmitter processor or a sensor processor, may update records of the internal mapping memory as new mapping data is identified and stored. In some embodiments, the mapping data stored in the internal mapping memory may be transmitted to additional devices of the system 100, and/or the mapping data in the internal mapping memory may be transmitted and stored into an external mapping memory at a regular interval or in real-time.

A system 100 may include an external mapping memory, which may be a system database 106 or a collection of machine-readable computer files, hosted by non-transitory machine-readable storage media of one or more system servers 104. In such embodiments, the system database 106 may be communicatively coupled to the user device 102 and/or the system server 104 by any wired or wireless communications protocols and hardware. The system database 106 may contain mapping data for one or more communication fields that are associated with the user device 102 and/or the system server 104. The records of the system database 106 may be accessed by each user device 102, which may update the mapping data when scanning a communication field for receivers (of a wearable device such as deciphering eyeglasses) or users 110; and/or query the mapping data when determining whether to scramble or unscramble screen and/or content on the screen of the user device 102.

System databases 106 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various sensor data queries and other management functions generated by the system server 104. In some embodiments, a memory of the system databases 106 may be a non-volatile storage device. The memory may be implemented with a magnetic disk drive, an optical disk drive, a solid-state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. In some embodiments, a memory of the system databases 106 may be a temporary memory, meaning that a primary purpose of the memory is not long-term storage. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

FIG. 2 illustrates a wearable device 200, according to an exemplary embodiment. For ease of explanation, the FIG. 2 shows the wearable device 200 as eyeglasses, however, it should be appreciated that some embodiments may include any suitable wearable device 200 capable of performing various tasks described herein. For example, the wearable device 200 may be a display device in form of glasses, goggles, or any other structure comprising a frame 202 that supports and incorporates various components of the wearable device 200, as well as serves as a conduit for electrical and other component connections. In some other embodiments, a software product running on a camera (e.g., an application executing on a mobile device enabled with a camera device) may also be used as the wearable device. Therefore, even though described as a wearable device 200, the wearable device 200 may still be operational while not worn by the user.

A wearable device 200 is configured for viewing and interacting with a real world item such as text displayed on a user computing device (as described in the FIG. 1), with a virtual display of imagery and/or text. For instance, the wearable device 200 may comprise augmented reality systems, which may be a form of virtual reality (VR) that unscrambles and layers virtual information (such as scrambled text displayed on a user computing device) over a live camera feed (using a camera attached on the wearable device 200) into the wearable device 200 or through a smartphone or tablet device giving a user of the wearable device 200 the ability to view three-dimensional and/or unscrambled text on display lenses (204a and 204b) of the wearable device 200. In some embodiments, the display lenses (204a and 204b) may be a virtual retinal display (VRD). The VRD display is scanned directly onto retina of the user's eye, which results in bright images displaying unscrambled text with high revolution and high contrast. The user sees a conventional display displaying unscrambled text floating in space.

A wearable device 200 may include a lens unit having two or more display lenses (204a and 204b) connected to the frame 202. The frame 202 is an eyeglass frame adapted to be located on a head of a user. When the frame 202 is located on the head of the user, the display lenses 204 are located in front of the user's eyes. In an alternate embodiment, any suitable type of frame could be provided, such as a headset or helmet. In some embodiments, the wearable device 200 could comprise merely one display lenses or more than two display lenses (204a and 204b).

Display lenses (204a and 204b) may include one or more cameras, which may be devices for capturing a photographic image or recording a video. The one or more cameras may be placed on at least one of the display lenses (204a and 204b). When the wearable device 200 is synchronized with a user computing device (as described in the FIG. 1) and/or a user wearing the wearable device 200 is authorized, then scrambled text information displayed on the user computing device may be relayed to the user through the wearable device 200 as an overlay on the camera attached on the display lenses (204a and 204b).

Display lenses (204a and 204b) may further include an LCD display. In some embodiments, the display lenses (204a and 204b) may include an imaging system, which can be implemented with any number of micro display panels, lenses, and reflecting elements to display and project an image. The display panels, lenses, and/or reflecting elements of the imaging system can be implemented with various display technologies, such as implemented with a transparent LCD, or using a projection technology. The projection technology can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

A wearable device 200 may be implemented as an independent, portable device that further includes communication electronics, which may include transmitters, receivers, cameras, sensors, memory, software, a processor, and/or a power source. The transmitter and the receiver may use communications signals to communicate information relating to each other in the form of signals carrying digital data. The transmitter and the receiver may use communications signals to communicate information (such as location data and credentials) relating to the wearable device 200 in the form of signals carrying digital data to user computing device (now shown). In addition, the wearable device 200 may be communicatively linked (using Bluetooth) to a controller such as a system server and/or a user computing device that includes any one or combination of the memory, software, processor, and/or power source, such as a battery unit. The system server and/or the user computing device can be implemented for wired or wireless communication with the wearable device 200. The system server, the user computing device, and/or the wearable device 200 can also be implemented with any number and combination of differing components. For example, the system server, the user computing device, and/or the wearable device 200 includes a decipher/scrambler application implemented as computer-executable instructions, such as a software application, and executed by a processor to implement embodiments of the wearable device 200.

The execution of the software application results in configuration of the display lenses (204a and 204b). The display lenses (204a and 204b) then displays an image from a screen of the user computing device transmitted by cable or wireless technology from the computing device. The display lenses (204a and 204b) contains a processor to unscramble a transmitted image (for example, a scrambled screen image) from the computing device such that only the user wearing the eyeglasses 200 can see the unscrambled data in the screen image.

A wearable device 200 may further include a detector, which may comprise hardware, which may allow the detector to receive Bluetooth or other communication signals originating from a user computing device. The detector may be used by users using the wearable device 200 to identify a location of the user computing device, so that users may determine a placement of a screen of the user computer device. In some embodiments, the detector may comprise an indicator light that indicates when the detector is wirelessly connected with the user computing device. For example, when a detector of the wearable device 200 is located within the a signal range (Bluetooth range) generated by a Bluetooth transmitter of the user computing device, it may trigger the detector to turn on their respective indicator lights because the detector is receiving Bluetooth signals, whereas, the indicator light of the detector, is turned off, when the detector is not receiving the Bluetooth signals from the transmitter of the user computing device.

FIG. 3A illustrates a user computing device 302 displaying unscrambled text content 304 based on a first position of a user 308 and FIG. 3B illustrates the user computing device 302 displaying scrambled text 306 based on a second position of a user 304. The user computing device 302 may include an output component such as a display screen 310 which may include one or more of the display components such as a cathode ray tube, a liquid crystal display, an OLED display, an AMOLED display, a super-AMOLED display, a plasma display, an incandescent light, a fluorescent light, a front or rear projection display, or a light emitting diode indicator.

A user interface of the user computing device 302 may be connected to a processor of the user computing device 302 for entering data and commands in the form of text, touch input, gestures, etc. The user interface may be a touch screen device, but may alternatively be an infrared proximity detector or sensor or any input/output device combination capable of sensing gestures and/or touches including a touch-sensitive surface. In addition, the user interface may include one or more components, such as a video input component such as an optical sensor (for example, a camera or imaging technology), an audio input component such as a microphone, and a mechanical input component such as button or key selection sensors, a touch pad sensor, a touch-sensitive sensor, a motion sensor, and/or a pointing device such as a joystick, a touch pad, a touch screen, a fingerprint sensor, or a pad for an electronic stylus. One or more of these user interface devices may function in multiple modes.

A user computing device 302 may include an authentication apparatus such as a sensor device for facial, iris, retina, eye vein, and/or face vein recognition or other facial feature or facial component recognition that capture images and/or emits sensor waves; and generate sensor data associated with face detection, head movement, and/or other facial features of a user 308, which may be stored on a database in the user device 302 and/or a mapping memory. The authentication apparatus may further draw upon stored information in the mapping memory, such as a look up table to compare and contrast data of new user with known users, including data related to information on facial, iris, retina, and/or eye vein information, fingerprints, breath analysis, body odor, voice patterns, etc.

A user computing device 302 may include one or more processors that may receive camera data and/or sensor data for facial, iris, retina, eye vein, and/or face vein recognition or other facial feature from the sensors, and/or fetch stored sensor data such as a look up table from the particular storage locations; thus, the sensor data produced by the respective sensor may be shared with the user computing device 302. The processors of the user computing device 302 may then use currently captured sensor data, to scramble or unscramble screen and/or content on the screen of the user computing device 302 when the user 308 is detected within an operation range of the sensor of the user computing device 302.

For instance, in some embodiments, a user computing device 302 may be associated with an eye-tracking module that is implemented as a software module running on associated hardware, and configured to receive command data from a processor of a user computing device 302, process the command data into hardware operation data, and provide the hardware operation data to an eye-tracking sensor module. The eye-tracking module is configured to receive ocular sensor data from eye-tracking sensor module, processes the ocular sensor data to generate ocular engagement data, and provides the ocular engagement data to the processor. Further to these embodiments, ocular engagement data includes one or more metrics characterizing the level of engagement of user 308 with content being displayed via a screen of a user computing device 302. In an example, the ocular engagement data includes data describing whether or not the gaze of the user 308 is directed toward the content displayed via the screen, a general level of interest in the content displayed via the screen as determined by the eye movements of the user 308, and the like. In these embodiments, hardware operation data includes instructions for hardware operation, such as instructions to activate eye-tracking sensors, to begin to track the gaze of the user 308, to stop tracking the gaze of user 308, and the like.

An eye-tracking sensor module is implemented as a software configured to control associated hardware, and configured to receive hardware operation data from the eye-tracking module, interact with the user 308 in order to generate ocular sensor data, and provide the ocular sensor data to the eye-tracking module. In these embodiments, ocular sensor data includes data describing the movement of the eyes of the user 308. In one example, the eye-tracking sensor module is implemented as software configured to control a camera hardware (e.g., a camera pair, not shown) included within the user computing device 302 that is configured to determine the direction of the gaze of the user 308. In this example, ocular sensor data includes the length of stare of the user 308 on one or more regions of content being displayed via the screen, whether or not the user 308 is looking at one or more portions of content being displayed via the screen, and the path of the gaze of the user 308 as the user 308 views content being displayed via the screen. The processors of the user computing device 302 may then use currently captured ocular sensor data, to scramble or unscramble screen and/or content on the screen of the user computing device 302. As shown, the processor of the user computing device 302 displays the unscrambled content 304 on the display screen 310 of the user computing device 302 when the sensor detects and authenticates the user 308 viewing the screen based on the ocular sensor data, and the processor of the user computing device 302 displays the scrambled content 306 on the display screen 310 of the user computing device 302 when the sensor detects the user 308 facing away from the screen based on the ocular sensor data.

A eye-tracking module may utilize sensor or camera data to determine the gaze of the user 308. In one embodiment, a light (e.g., infrared) is reflected from the user 308 eye and a video camera or other sensor can receive the corneal reflection. The eye-tracking module analyzes the ocular sensor data of the user 308 to determine eye rotation of the user 308 from a change in the light reflection. A vector between a pupil center of the user 308 and the corneal reflections of the user 308 can be used to compute a gaze direction of the user 308. Eye movement data of the user 308 may be based upon a saccade and/or a fixation, which may alternate. A fixation is generally maintaining a visual gaze on a single location, and it can be a point between any two saccades. A saccade is generally a simultaneous movement of both eyes of the user 308 between two phases of fixation in the same direction.

In one implementation, the eye-tracking module can use a dark-pupil technique, whereby if the illumination source is offset from the optical path, then the pupil appears dark as the retro reflection from the retina of the user 308 is directed away from the camera. In another implementation, the eye-tracking module can use a bright-pupil technique, whereby if the illumination is coaxial with the optical path, then the eye of the user 308 acts as a retro reflector as the light reflects off the retina creating a bright pupil effect. In yet another implementation, a camera or sensor can track eye image features (e.g., retinal blood vessels) and follow the features as the eye of the user 308 rotates. It is preferable that the eye tracking data is obtained in a manner that is non-invasive. In yet another implementation, a camera or sensor can identify a location of an iris of the user 308 or pupil of the user 308 based on the circular shape or by detection an edge. The movement of the iris or pupil of the user 308 can then be detected. The processors of the user computing device 302 may then use currently captured iris/pupil data, to scramble or unscramble screen and/or content on the screen of the user computing device 302. As shown, the processor of the user computing device 302 displays the unscrambled content 304 on the display screen 310 of the user computing device 302 when the sensor detects and authenticates the user 308 viewing the screen based on the iris/pupil data, and the processor of the user computing device 302 displays the scrambled content 306 on the display screen 310 of the user computing device 302 when the sensor detects the user 308 facing away from the screen based on the iris/pupil data.

In some embodiments, a user computing device 302 may be associated with an expression processing module, which may be an eye-tracking processing module or a head tracking module. The expression processing module can use a coding system that recognizes eye movement and/or gaze direction of the user 308 and generates a score based on duration and direction. Eye movement or gazing may have a duration of about ½s of a second to 2 seconds or longer, so the expression processing module will receive a data feed of eye movements of the user 308 from a high speed camera having increments of less than one second to account for very quick changes. Some micro-eye movements occur so quickly that a human observer cannot detect or sense the shift in gaze or eye movement. In one implementation, supplemental content will be displayed when the eye movement of the user 308 meets a threshold value, when the gaze of the user 308 is directed away from the displayed content, or both. The processors of the user computing device 302 may then use currently captured eye movement data, to scramble or unscramble screen and/or content on the screen of the user computing device 302. As shown, the processor of the user computing device 302 displays the unscrambled content 304 on the display screen 310 of the user computing device 302 when the sensor detects and authenticates the user 308 viewing the screen based on the eye movement data, and the processor of the user computing device 302 displays the scrambled content 306 on the display screen 310 of the user computing device 302 when the sensor detects the user 308 facing away from the screen based on the eye movement data.

In some embodiments, a user computing device 302 may be associated with a tracking sensor module such as a head tracking sensor module which is implemented as software configured to control associated hardware, and configured to receive hardware operation data from the head-tracking module, interact with the user 308 in order to generate head position data of the user 308, and provide the head position data of the user 308 to the head tracking module. In these embodiments, the head position data of the user 308 includes data describing the movement of the head of the user 308. In an example, head-tracking sensor module is implemented as software configured to control camera hardware (e.g., a camera pair, not shown) included within the user computing device 302 that is configured to determine the position of the head of the user 308. In this example, head position data of the user 308 includes the position of the head of the user 308 with respect to one or more regions of content being displayed via the screen of the user computing device 302, whether or not the user 308 is looking at one or more portions of content being displayed via the screen, and the path of the head movement of the user 308 as the user 308 views content being displayed via the screen.

A head tracking module may utilize sensor or camera data to determine the initial head position of a user 308 and any subsequent change from the initial head position of the user 308. In one embodiment, a light (e.g., infrared) is reflected from the user 308 head and a video camera or other sensor can receive the reflection from the user 308 head. The head tracking module analyzes the head position data of the user 308 to determine head movement of the user 308 from a change in the light reflection. A vector between a location on the user 308 head and the head reflections can be used to compute a change in head position or direction. Head position data of the user 308 may be based upon a movement and/or a fixation, which may alternate. A fixation is generally maintaining a head position in single location. A movement is generally any change in position of the head of the user 308 from an initial position. The processors of the user computing device 302 may then use currently captured head movement data, to scramble or unscramble screen and/or content on the screen of the user computing device 302. As shown, the processor of the user computing device 302 displays the unscrambled content 304 on the display screen 310 of the user computing device 302 when the sensor detects and authenticates the user 308 viewing the screen based on the head movement data, and the processor of the user computing device 302 displays the scrambled content 306 on the display screen 310 of the user computing device 302 when the sensor detects the user 308 facing away from the screen based on the head movement data.

Figure 3G:
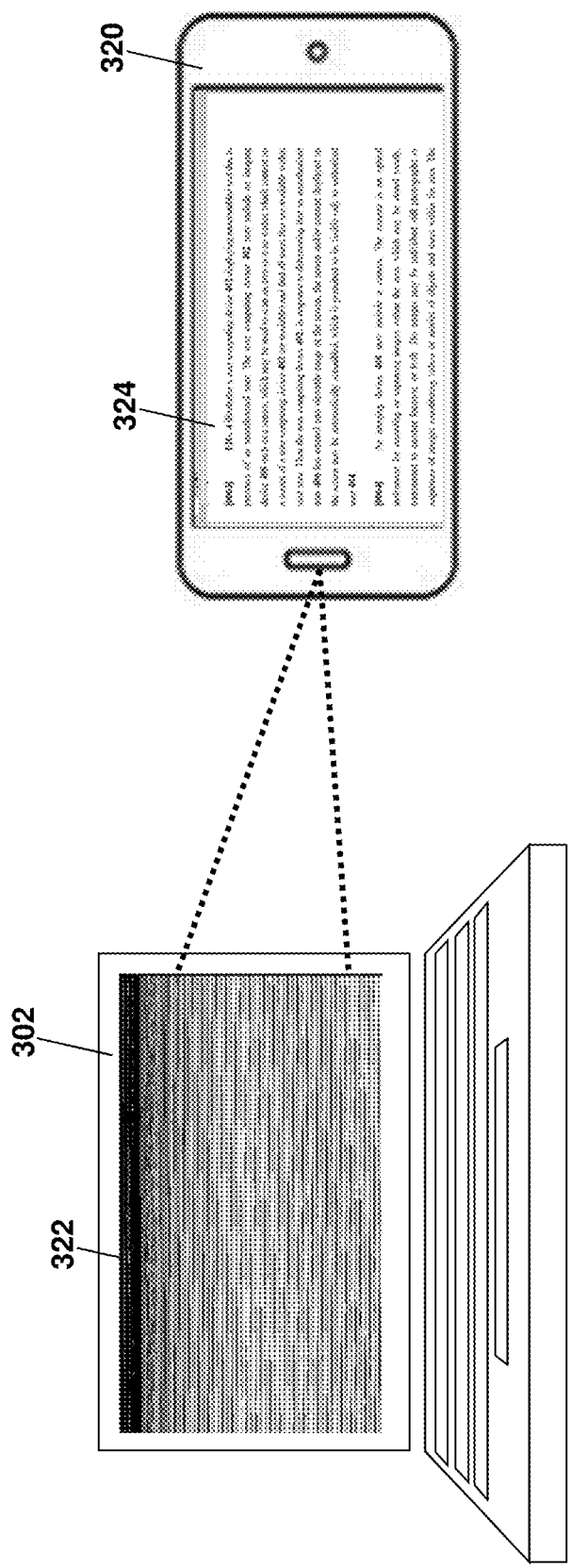
FIG. 3G illustrates a user computing device displaying scrambled text and a wearable device displaying unscrambled version of scrambled text displayed on the user computing device, according to an exemplary embodiment.

In another example case, as depicted in FIG. 3G, a user 308 may be using a device 320 such as a mobile phone, and when the user 308 and/or the device 320 comes into proximity of a user computing device 302 displaying scrambled content 322, then an authentication apparatus of the user computing device 302 may authenticate the user 308 and/or the device 320. Upon successful authentication of the user 308 and/or the device 320, then the device 320 may determine a decryption technique to unscramble/decrypt the scrambled data/content 322 that is unreadable to a human. For instance, a first decryption technique may be applicable to unscramble a first type of scrambled content (for example, scrambled content such as scrambled pixels 322 displayed on the user computing device 302) and a second decryption technique may be applicable to unscramble a second type of scrambled content (for example, jumbled alphabets).

Thus, firstly, the device 320 may determine a type of scrambled content 322 displayed on a screen of the user computing device 302, and upon determining the type of scrambled content 322, the device 320 may then identify a decryption technique applicable to the determined type of scrambled content 322 to unscramble the content. Upon analysis, the device 320 may determine that the scrambled content 322 comprises scrambled pixels, and thus a first decryption technique is applicable based on records associated with decryption techniques. Upon identification of the first decryption technique, then the device 320 execute the first decryption technique, which may result in transmission and display of unscrambled content 324, which may be readable by humans on a GUI of the device 320.

Figure 3H:
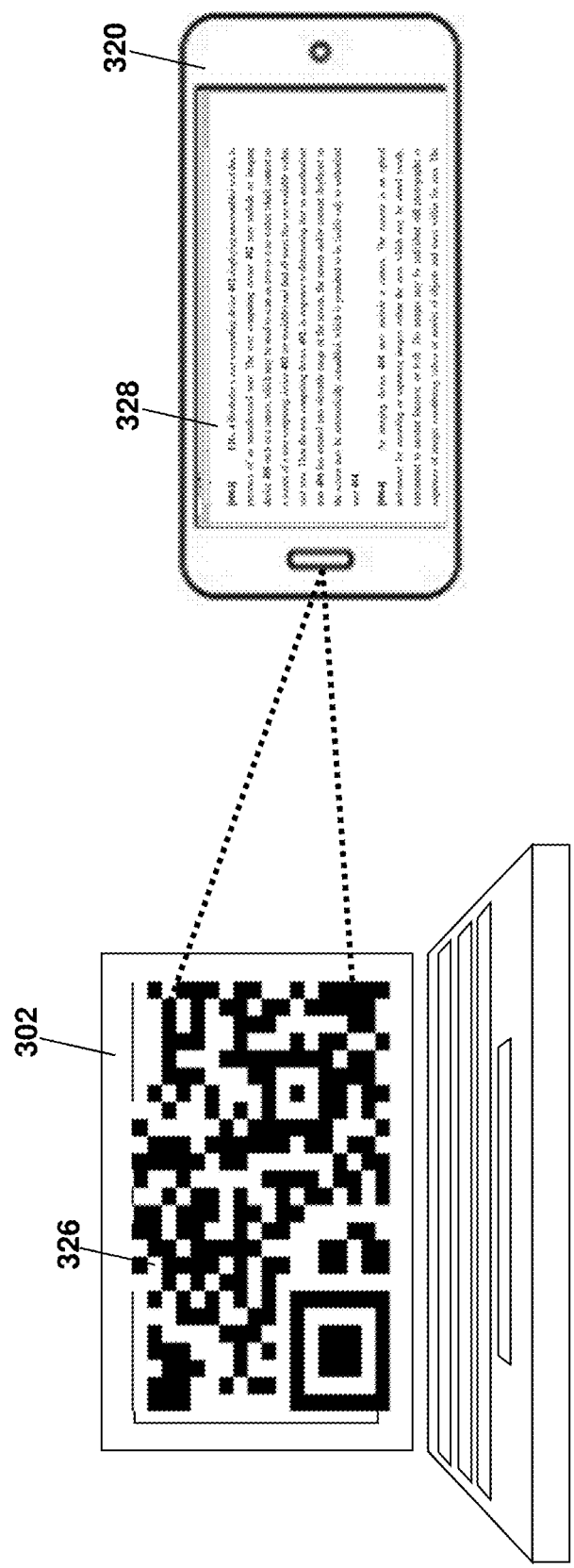
FIG. 3H illustrates a user computing device displaying scrambled text and a wearable device displaying unscrambled version of scrambled text displayed on the user computing device, according to an exemplary embodiment.

In yet another example case, as depicted in FIG. 3H, a user computing device 302 displays encrypted content on its screen in form of a machine readable code 326. The machine readable code 326 image may be a QR code image, barcode image, or other known code image for use with an optical scanner. In some embodiments, the machine readable code 326 image may represent a code that is a string of alphanumeric characters that are generated by an algorithm contained within the user computing device 302 application. A user 308 may be using a device 320 such as a mobile phone comprising an optical scanner to scan the machine readable code 326 image on the user computing device 302. After the machine readable code 326 image is scanned by the optical scanner of the device 320, the user computing device 302 may first determine identification data associated with the device 320 to authenticate the device 320. The user computing device 302 may use the identification data associated with the device 320 to search a database comprising records of approved devices that are eligible to view content on the user computing device 302. The successful authentication of the device 320 by the user computing device 302 may then result in transmission and display of decrypted content 328 on a GUI of the device 320, which may be readable by humans.

In alternate embodiments, upon the identification of the first encryption technique, the device 320 may transmit a notification regarding the first encryption technique to the user computing device 302, and the user computing device 302 may then execute the first encryption technique, which may result in transmission and display of unscrambled content 324, which may be text readable by a human on a GUI of the device 320.

Figure 4:
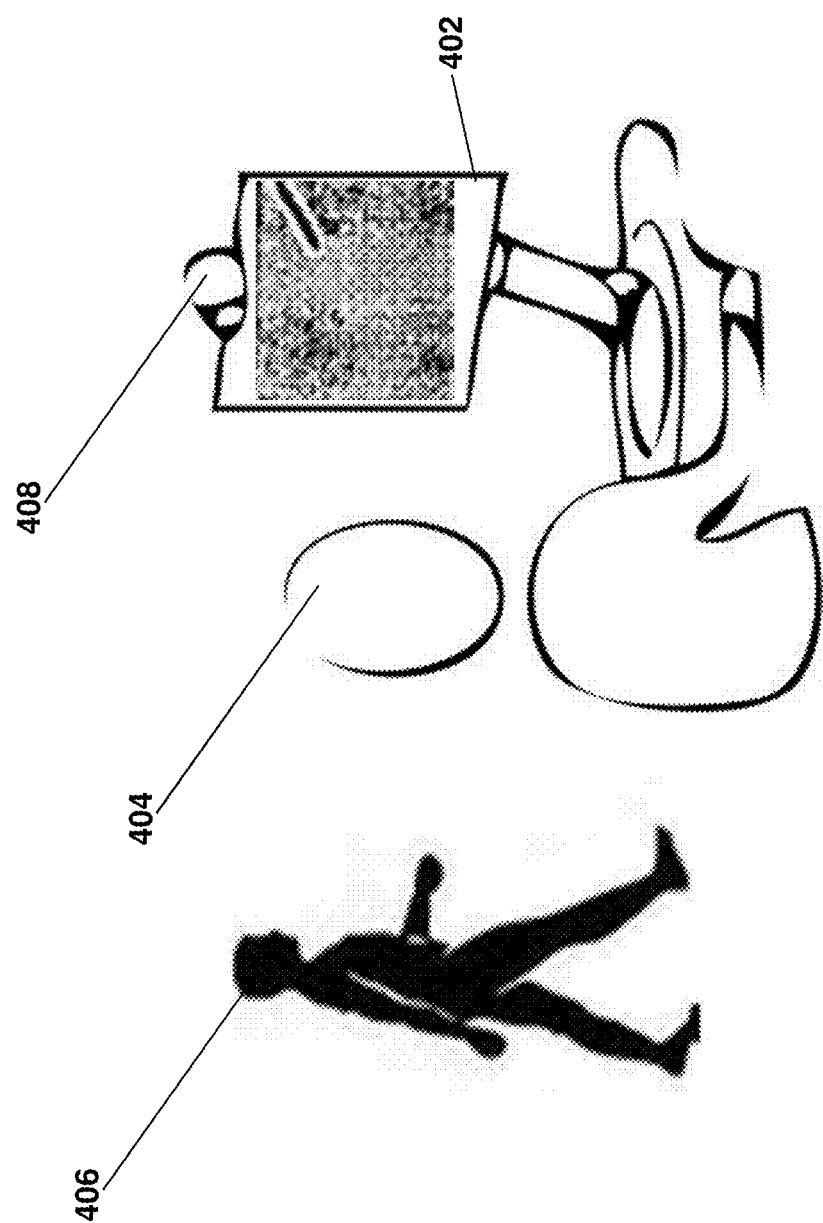
FIG. 4 illustrates a user computing device displaying unscrambled text due to presence of an unauthorized user, according to an exemplary embodiment.

FIG. 4 illustrates a user computing device 402 displaying scrambled text due to presence of an unauthorized person. The user computing device 402 may include an imaging device 408 such as a sensor or camera, which may be used to scan an area (a zone within which content on a screen of a user computing device 402 are readable) and find all users that are available within said area. Then the user computing device 402, in response to determining that an unauthorized user 406 has entered into viewable range of the screen, the screen and/or content displayed on the screen may be automatically scrambled, which is permitted to be visible only to authorized user 404.

An imaging device 408 may include a camera. The camera is an optical instrument for recording or capturing images within the area, which may be stored locally, transmitted to another location, or both. The images may be individual still photographs or sequences of images constituting videos or movies of objects and users within the area. The camera may use an electronic image sensor, such as a charge coupled device or a CMOS sensor to capture images within the area, which may be transferred or stored in a memory or other storage inside the camera, a system server, or the user computing device 402 for processing.

The raw images from an imaging device 408 are transmitted to a processor of a user computing device 402 or a system server, which segregates the images (based on content within it) and normalize the images. The user computing device 402 and system server may be connected to each other through a network to share data among each other. While processing the images captured within the area, the processor of the user computing device 402 may employ face recognition technology for processing the normalized image. The face recognition technology may use pattern recognition and facial expression analysis to recognize users captured within the images. In one method, the face recognition technology may detect facial area within the images using a neural network. In another method, the face recognition technology may detect facial area within the images using statistical features of facial brightness, which may be a principal component analysis of brightness within the captured images.

In operation, in order to recognize user faces within images captured of an area, a user computing device 402 may employ an extracted face image as an input of a face recognition technology as a means of detecting the exact position of facial components or facial features in the extracted face region. In other words, in order to compare an input image with a face recognition model, face position extraction and a size normalizing process for compensating for differences in size, angle, and orientation of the facial image extracted from the input image relative to a facial image of the face recognition model template are performed. In some embodiments of the face recognition models, an eye area may be used as a reference facial component in the alignment and the normalizing processes since the feature of the eye area remain unchanged compared with those of other facial components, even if a change occurs in the size, expression, lighting, etc., of a facial image.

One or more techniques may be employed for eye detection, which may normalize correlation at all locations within an input image by making eye templates of various sizes and forming a Gaussian pyramid image of the input image. In one technique, a matrix for eyes, nose, and mouth areas may be provided according to a size of a template, and features of interest are searched through comparison with an input image in all areas within the template image. In another technique, a template having two ellipses for detecting facial ellipses may be used to detect a facial location through evaluating a size of edge contours which may encircle a face in a region between the two ellipses.

A user computing device 402 or a system server upon identifying users within an area using face recognition technology may then determine whether the users are authorized or unauthorized. In some embodiments, the user computing device 402 or the system server may compare biometric or facial data of the users that has been identified with information in a biometric or facial feature database to determine the authorization of the identified users to view certain content on a screen of the user computing device 402. Where the captured biometric or facial data from an identified user matches a template within the biometric or facial feature database, the user may be identified as being authorized. The identified user may be treated as an unauthorized person in the absence of authenticating the user as an authorized user.

A user computing device 402 or a system server, upon identifying an unauthorized user 406 within a pre-defined area (when a face of user 406 doesn't matches a known template within a database), may determine a location of the unauthorized user 406 within the area. The user computing device 402 or the system server may use one or more motion sensors directly or indirectly associated with the user computing device 402 or the system server to determine exact location of the unauthorized user 406 within the area. In some embodiments, the user computing device 402 or the system server may use one or more location sensors directly or indirectly associated with the user computing device 402 or the system server to determine exact location of the unauthorized user 406 within the area. The one or more location sensors may detect the actual location of the unauthorized user 406 by generating an electromagnetic beam, such as an infrared or laser beam, and analyzing reflections from the electromagnetic beam to determine the position of the unauthorized user 406 based on the reflections.

In some embodiments, any suitable location determination technique may be used by the user computing device 402 or the system server to determine the exact location of the unauthorized user 406 within the area. The user computing device 402 or the system server upon determining the location of the unauthorized user 406 may further determine whether a screen of the user computing device 402 is within viewable range of the unauthorized user 406. The user computing device 402 may determine whether the screen is within the viewable range of the unauthorized user 406 depending on whether there is an unobstructed line of sight between one or both of the unauthorized user 406 eyes and the screen. In some embodiments, whether a screen of the user computing device 402 is within viewable range of the unauthorized user 406 may also depend on the distance between the unauthorized user 406 eyes and the screen. In some embodiments, whether a screen of the user computing device 402 is within viewable range of the unauthorized user 406 may also depend on the distance between the unauthorized user 406 and the screen.

In some configurations, the user computing device 402 or the system server, upon identifying that the unauthorized user 406 is within the viewable range of the screen, may generate and execute software programs to lock the screen, scramble the screen, scramble the content on the screen such that content is not readable by a human, and/or hide sensitive data displayed on the screen (and only display insensitive data). The user computing device 402 or the system server may continuously monitor the location and/or movement of the unauthorized user 406, and upon identifying that the unauthorized user 406 has moved away from the viewable range of the screen, may generate and execute software programs to unlock the screen, unscramble the screen, unscramble the content on the screen such that content is readable by a human, and/or display sensitive data displayed on the screen.

Figure 5:
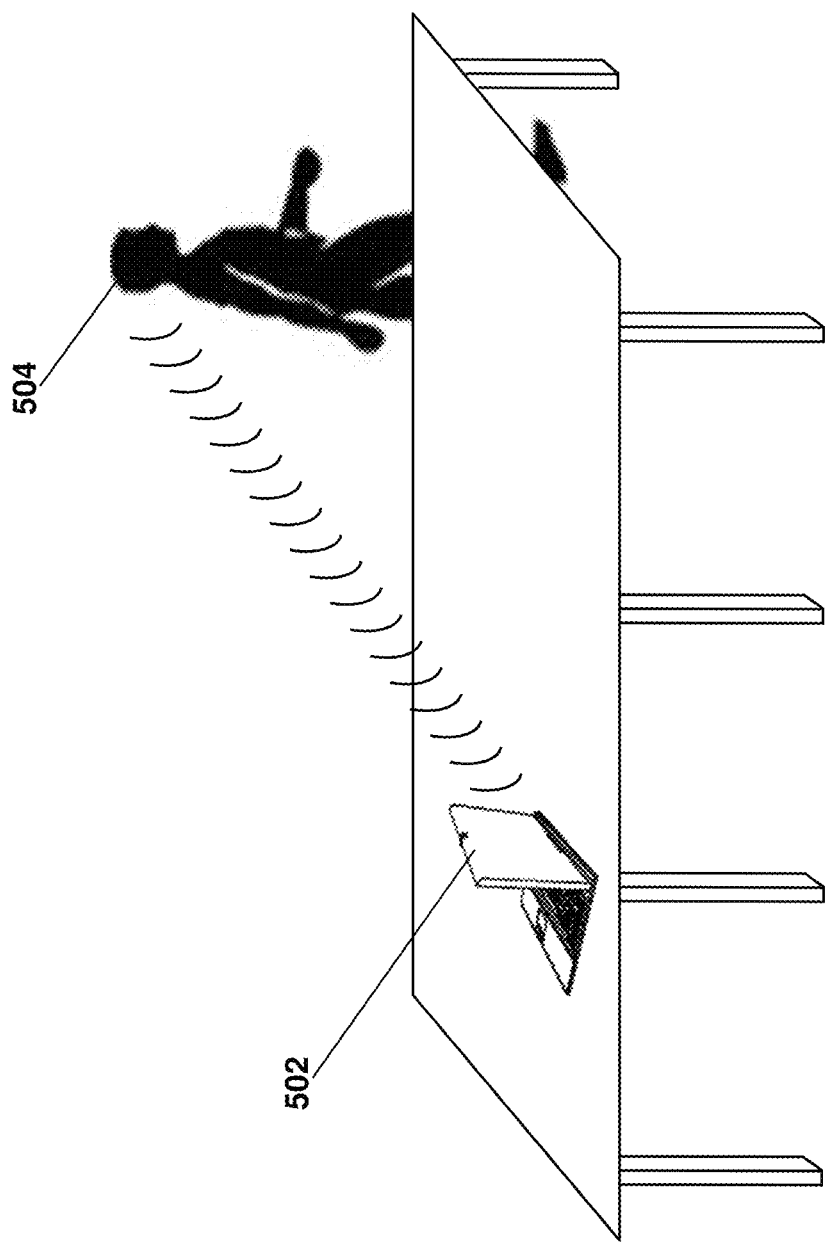
FIG. 5 illustrates a user computing device displaying scrambled text due to a current location of a user, according to an exemplary embodiment.

FIG. 5 illustrates a user computing device 502 displaying scrambled text due to a current location of a user 504. The user computing device 502 may include a transmitter that transmits connection signals to connect with a receiver of a wearable device (for example, eyeglasses) operated by the user 504. The user computing device 502 and a system server may be connected to each other through a network to share data among each other. Non-limiting examples of the user computing device 502 may include laptops, mobile phones, smartphones, tablets, electronic watches, among other types of devices.

A connection signal may serve as data input used by various communication elements responsible for controlling production of communication signals. The connection signal may be produced by the receiver of the wearable device or the transmitter of the user device 502 using an external power supply and a local oscillator chip, which in some cases may include using a piezoelectric material. The connection signal may be any communication medium or protocol capable of communicating data between processors of the user device 502 and the wearable device, such as Bluetooth®, RFID, infrared, near-field communication (NFC). The connection signal may be used to convey information between the transmitter of the user device 502 and the receiver of the wearable device used to adjust the connection signal, as well as contain information related to status, device identifier, geo-location, and other types of information.

Initially, a wearable device establishes a wired or wireless connection or otherwise associates with a user device 502. That is, in some embodiments, the user device 502 and the wearable device may communicate control data over using a wireless communication protocol capable of transmitting information between two processors of the user device 502 and the wearable device (e.g., Bluetooth®, Bluetooth Low Energy (BLE), Wi-Fi, NFC, ZigBee®). For example, in present embodiments implementing Bluetooth® or Bluetooth® variants, the user device 502 may scan for wearable device broadcasting advertisement signals or a wearable device may transmit an advertisement signal to the user device 502.

The advertisement signal may announce the wearable device's presence to the user device 502, and may trigger an association between the user device 502 and the wearable device. As described herein, in some embodiments, the advertisement signal may communicate information that may be used by various devices (e.g., user device 502, wearable device, sever computers, etc.) to execute and manage secure display of content on screen of the user device 502. Information contained within the advertisement signal may include a device identifier (e.g., wearable device address) and a user identifier (e.g., user name). The user device 502 may use the advertisement signal transmitted to identify the wearable device (and the user 504) and, in some cases, locate the wearable device (and the user 504) in a two-dimensional space or in a three-dimensional space.

Once the user device 502 identifies the wearable device used by a user 504 and/or the user 504 itself, the user device 502 may then establish a wireless connection with the wearable device and/or authorizes the user 504, allowing the user device 502 and wearable device to communicate control signals over a communication channel. In some cases, the user device 502 may use the advertisement signal to authenticate user 502, determine a role of user 502, and then display unscrambled content on screen of the user device 502 based on permissible unscrambled content based on the role of the user. The user device 502 may use information contained in the wearable device advertisement signal, or in subsequent connection signals received from the wearable device, to determine what unscrambled content and for how much time to display on the screen of the user device 502.

In some embodiments, when a user device 502 identifies and wirelessly connects with a wearable device, a system server, the user device 502 and/or the wearable device may then initiate steps to authenticate a user 504 using the wearable device, unlock a screen of the user device 502, unscramble screen and/or content on the screen, and thereby allowing the user 504 to view unscrambled content on the unlocked screen of the user device 502. The system server, the user device 502 and/or the wearable device may authenticate the user 504 based on security mechanisms, which may use biometric identification of the user 504. For example, the security mechanisms may be biometric-based security processes, and based on, or include, use of a biometric component such as a fingerprint reader, an iris scanner, a voice recognition mechanism, an image analysis/facial detection mechanism, etc., that can be used to identify a particular user 504 using a particular wearable device.

In some embodiments, the system server, the user device 502 and/or the wearable device may implement a pulse detection apparatus to authenticate the user 504, which may use pulse waveform data of the user 504 and uses the pulse waveform data to conduct biometric identification of the user 504. The pulse data measurements of the user 504 may be gathered using a variety of sensors of the pulse detection apparatus on fingers, wrists, temples, eyes, of the user 504 or through other similar means.

In some embodiments, during an enrollment process of a user 504 for biometric-based security process, a biometric signature created by a system server to authenticate the user 504 may be generated from biometric profiles of the user 504. For example, an exemplary number of biometric profiles that may be averaged by the system server to create the biometric signature as used herein is two biometric profiles. However, any number of biometric profiles may be combined, each of which is created through an operation of the biometric profile creation session, which is a first part of the biometric-based security process that includes the presentation and biometric data biometric data capture portion, biometric data pre-processing portion, biometric data segmentation portion, and biometric data feature extraction portion. Accordingly, one or more biometric profiles may be used to establish a biometric signature of the user 504. In addition, during an authentication process, one or more biometric profiles of the user 504 may also be captured utilizing the biometric profile creation session previously used to capture the enrollment biometric profiles used to generate the biometric signature of the user 504 during the enrollment process for biometric-based security process.

A pulse detection apparatus may include various electronic components (such as sensors), and be part of or a separate component associated with a system server, a user device 502 and/or a wearable device. In one example, the pulse detection apparatus that contains pulse sensors may be integrated into the wearable device to provide dynamic biometric based measurements, for example, measurements of pulse wave data at one or more measurement points on the user 504. The measurements of the pulse wave data at the one or more measurement points on the user 504 is used to form a biometric signature for the user 504. In another example, the pulse detection apparatus integrated into the wearable device may obtain pulse data of the user 504 when user 504 is wearing the wearable device, where inputs from the sensors providing the pulse data of the user 504 is utilized to form a biometric signature for the user 504, which may be used to perform biometric identification of the user 504. In another example, the pulse detection apparatus may be included in the user device 502 or any system server that obtains the pulse data of the user 504 to perform biometric identification, e.g., from pulse sensors disposed on or viewing a user 504. The user 504 pulse data may include pulse data that permits an conclusion as to the identity of the user 504.

The pulse data of the user 504 may be collected at a plurality of points in order to offer a more accurate identification of the user 504. For example, two or more different blood vessels of the user 504 may be measured to obtain user 504 pulse data for each. The two or more measurements are combined or correlated with one another to further refine or improve the biometric identification. In some embodiments, one or more sensors may be used, e.g., on opposite sides of a wearable device, in order to obtain the pulse data of the user 504 at multiple locations. The pulse data for the multiple locations can be compared (as to time and magnitude, e.g., of a pulse wave) in order to form a biometric signature for the user 504. In another example, a camera of the user device 502 may sample or obtain image data of two or more different blood vessels in order to derive pulse data of the user 504, e.g., pulse wave data, for use in biometric identification of the user 504.

During a validation session of the biometric-based security process, a system server, a user device 502 and/or a wearable device may capture biometric data of the user 504 and then compare to the biometric signature of the user 504 to perform authentication of the user. For instance, the user device 502 and/or the wearable device may utilize the user 504 biometric pulse data to determine if the user 504 biometric pulse data matches expected user biometric pulse data. In other words, the currently detected user 504 pulse data obtained is compared to known user pulse data of a particular user in order to identify the particular user. The known user pulse data may be stored locally or accessed from a remote database. The known user pulse data may include a biometric signature or profile that has been generated based on historically detected user pulse data.

In accordance with various aspects of the disclosed embodiments, during an authentication operation based on the matching operation of determined versus expected biometric data of the user 504, each point of the captured biometric pulse data of the user 504 may be compared to a respective point in the biometric signature using a matching algorithm, such as Euclidean distance, hamming distance, etc., to evaluate if the verification biometric pulse data matches the biometric signature at a given threshold. Accordingly, the a profile of the user 504 with a biometric pulse data distribution does not have to be identical to the biometric signature. If the profile of the user 504 matches with the biometric signature, then the user 504 is authenticated, and if there is no match then authentication of the user 504 is denied.

If the user 504 is identified, using the pulse data of the user 504, that is, the currently detected pulse data of the user 504 is similar or equivalent to known pulse data of the user 504, the user 504 may be granted access to view unscrambled content on the screen of the user device 502, and have continued access to the unscrambled content on the screen of the user device 502. If the user 504 is not identified using the detected pulse data, the lack of user identification may lead to a requirement for further authentication data and/or may result in reduced user device 502 functionality. For example, if a user 504 is identified using the user pulse data, user-specific functionality may be provided by the user device 502 and the unscrambled screen will be displayed on the user device 502. In contrast, if the particular user 504 is not identified using the user pulse data, a temporary setting may be applied to the user device 502 and the scrambled screen will be displayed on the user device 502, subject to further identification being made, e.g., using certain information that the user 504 has knowledge of, such as a password, two factor identification methods, or certain information which the user 504 has possession of, such as a token, or one or more physical characteristics of the user 504, such as the user's fingerprint profile.

In some embodiments, when a wired or wireless connection between a wearable device used by a user 504 and a user device 502 is terminated because the wearable device or the user 504 wearing the wearable device are out of range from the user device 502, then a system server and/or the user device 502 may generate and execute software programs to lock a screen of the user device 502, scramble the screen, scramble content on the screen such that content is not readable by a human, and/or hide sensitive data displayed on the screen (and only display insensitive data). The user computing device 402 or the system server may monitor the location and/or movement of the wearable device or the user 504 wearing the wearable device, and upon re-establishing the wired or wireless connection between the wearable device used by the user 504 and the user device 502 when the wearable device used by the user 504 and the user device 502 are in range of each other, then the system server and/or the user device 502 may again initiate authentication process of the user 504. Upon authentication of the user 504, the system server and/or the user device 502 may then generate and execute software programs and/or algorithms to unlock the screen, unscramble the screen, unscramble content on the screen such that content is readable by a human, and/or display sensitive data on the screen.

Figure 6:
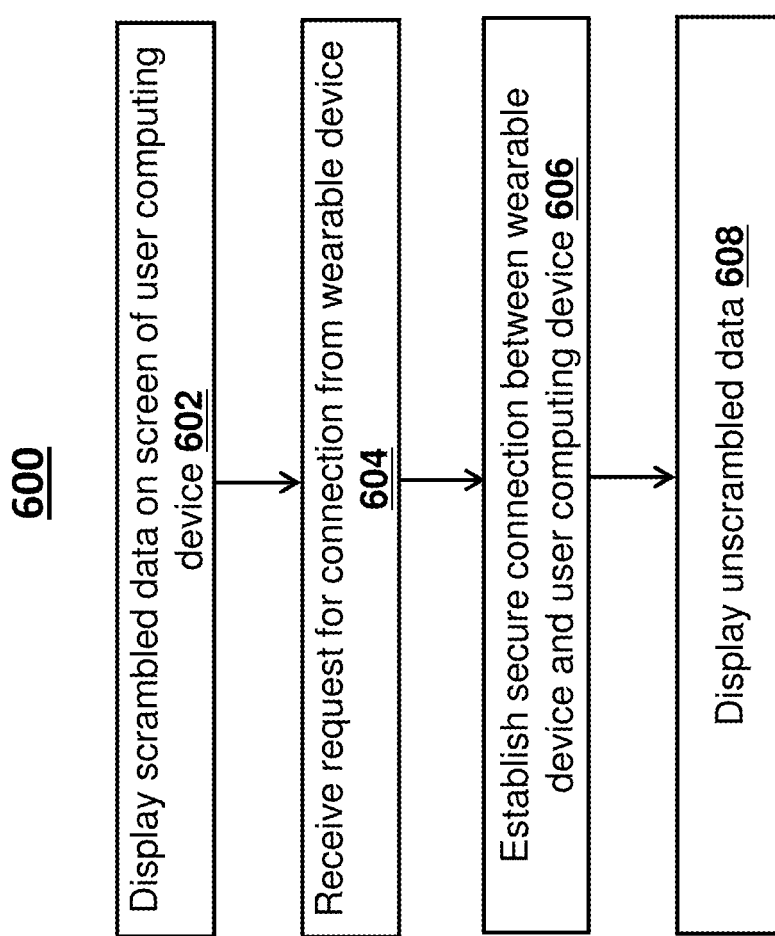
FIG. 6 shows execution of a method showing operations of a distributed data processing and display system, according to an exemplary embodiment.

FIG. 6 shows execution of a method showing operations of a distributed data processing and display system, according to an exemplary method 600. The exemplary method 600 shown in FIG. 6 comprises execution steps 602, 604, 606, and 608. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 600 of FIG. 6 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as a user computing device or a system server described herein.

In a first step 602, a user computing device may display on its graphical user interface (GUI) or a monitor screen, an image or a video content. The image and/or the video content may include textual or visual data/information.

The screen may be an output device, which displays information such as the image or the video content in pictorial form. The screen may include a display device, circuitry, casing, and power supply. The display device may be a thin film transistor liquid crystal display, light-emitting diode display, or an organic light-emitting diode display. The screen may be connected to the user computing device via VGA, Digital Visual Interface (DVI), HDMI, Display Port, Thunderbolt, low-voltage differential signaling (LVDS) or other proprietary connectors and signals.

Initially, when a user computing device is not being operated by any user, a screen of the user computing device may be scrambled or scrambled data/content may be displayed on the screen that is unreadable to a human. The term "scrambled" and "encrypted" may be interchangeably used. In some embodiments, the scrambled data may correspond to jumbled letters, which may not make any sense to the user. For example, the user computing device or a system server may randomly arrange words and letters, and put words or letters in a wrong order so that they do not make sense (even though maintaining the styles and numbers of letters in each word). The scrambling performed is random and may be undone using one or more unscrambling techniques.

In some embodiments, scrambled data may correspond to a plurality of segments of an image displayed on a screen such that information within segmented image is unreadable to a human. A user computing device and/or a system server associated with the user computing device may generate and execute software programs and/or algorithms to divide the display screen and/or the image on the screen into multiple segments. Upon dividing the display screen and/or the image on the screen into the multiple segments, in one embodiment, the user computing device and/or the system server may orient each of the segment such that the data in the segmented image is unreadable to the human. In another embodiment, upon dividing the display screen and/or the image on the screen into the multiple segments, the user computing device and/or the system server compress each segment such that the data in the segmented image is unreadable to the human. In yet another embodiment, upon dividing the display screen and/or the image on the screen into the multiple segments, the user computing device and/or the system server overturn each segment such that the data in the segmented image is unreadable to the human.

In a next step 604, a user computing device may receive a request for a wired or wireless connection from a wearable device. The wearable device may be a display device in form of eyeglasses, goggles, or any other structure comprising a frame that supports and incorporates various components of the wearable device, as well as serves as a conduit for electrical and other component connections.

A user computing device may transmit a request for the wired or the wireless connection to the wearable device when the wearable device is within a range of the user computing device. Each of the user computing device and the wearable device may include communication components, one or more transmitters, and one or more receivers. In one example, a transmitter of a user computing device may first identify and then transmit a request for connection to a receiver of a wearable device. In another example, a transmitter of a wearable device may first identify and then transmit a request for connection to a transmitter of a user computing device.

A transmitter and a receiver may communicate to each other with or without communication components. The communications component may include electromechanical components (e.g., processor, antenna) that allow the communications component to communicate various types of data with the receivers, transmitters, and/or other components of the transmitters. In some implementations, communications signals between the transmitter and the receiver may represent a distinct channel for hosting communications. The data may be communicated using the communications signals, based on predetermined wired or wireless protocols and associated hardware and software technology. The communications component may operate based on any number of communication protocols, such as Bluetooth®, Wireless Fidelity (Wi-Fi), Near-Field Communications (NFC), ZigBee, and others. However, it should be appreciated that the communications component is not limited to these technologies, but may include radar, infrared, and sound devices as well.

In a next step 606, a user computing device may connect to a wearable device. The computing device may connect to the wearable device, in response to the user computing device determining that a set of purported credentials associated with the wearable device received from the wearable device through communications signals matches a set of credentials authenticating the wearable device that are stored in a system database. For example, after the communication channel between the user computing device and the wearable device is established, then the user computing device may generate a graphical user interface (GUI) on the user computing device containing a credentials prompt requesting a user of the wearable device to input a set of user credentials. In some cases, after the communication channel between the user computing device and the wearable device is established, then the user computing device may transmit to the wearable device the GUI containing the credentials prompt. The wearable may then transmit to the user computing device, the set of user credentials, in response to the credentials prompt. The user computing device may then match the set of user credentials received from the wearable device with a set of credentials authenticating the wearable device that are stored in a system database. Once the match is confirmed, then the wearable device and the user computing device may be authenticated and connected. In some embodiments, upon the user computing device receiving the set of user credentials from the wearable device, in response to the credentials prompt, the user computing device may transmit the set of user credentials to a system server, which may be directly or indirectly connected to the user computing device. The system server may then match the set of user credentials received from the wearable device with a set of credentials authenticating the wearable device that are stored in a system database. Once the match is confirmed, the system server may authenticate the wearable device and the user computing device, and connect them to each other.

In some embodiments, during operation, a user computing device may receive a request from a wearable device to become a trusted wearable device for allowing a user using the wearable device access to content on a screen of the user computing device. The request may be generated in any suitable manner. For example, the user of the wearable device logs into a secure display application service installed on the user computing device and/or the wearable device where the request is generated. The user may log into the secure display application service by entering username and/or user ID of a user. When the user enters the login details, a request for authorizing the wearable device to become the trusted device may be generated, and then transmitted to a user computing device and/or a system server.

Upon the receipt of the request by the user computing device and/or the server, the user computing device and/or the server may implement a series of security protocols in order to verify the wearable device and the user. For instance, in a first layer of security protocol implemented by the user computing device and/or the server, the user computing device and/or the server may generate a security code that may be transmitted to a phone number of a mobile device of the user, and the user may be requested to read and/or enter the code on an user interface of the user computing device. The code may include a secret token, which may be, for example, a globally unique identifier (GUID), such as for example but not limited to a unique string of characters including, but not limited to letters or numbers or both. In another example, the code may also include one or more Uniform Resource Locators (URLs). In some embodiments, the code may be associated with an expiry time. The expiry time may be included in the code. The user may then read and enter the code into an user interface of the user computing device to establish secure connection and synchronization between the user computing device and the wearable device.

In a next step 608, once a wearable device and a user computing device are wirelessly connected to each other, a wearable device may determine a decryption technique to unscramble the scrambled data/content displayed on a screen of said user computing device that is unreadable to a human. In some embodiments, a first decryption technique may be applicable to unscramble a first type of scrambled content (for example, jumbled alphabets) and a second decryption technique may be applicable to unscramble a second type of scrambled content (for example, scrambled pixels). Thus, the wearable device may first determine a type of scrambled content displayed on the screen, and upon determining the type of scrambled content, may then identify an encryption technique applicable to the determined type of scrambled content to unscramble the content. Upon identification of the decryption technique, which may be applicable for the determined type of scrambled content, then the wearable device may execute the decryption technique, which may result in transmission and display of unscrambled content on the wearable device. In alternate embodiments, upon the identification of the decryption technique, which may be applicable for the determined type of scrambled content, the wearable device may transmit a notification regarding the identified decryption technique to the user computing device, and the user computing device may then execute the decryption technique, which may result in transmission and display of unscrambled (or decrypted) content on the wearable device. At a time when the user of the wearable device is able to view unscrambled content on the wearable device, the screen of the user computing device will continue to display scrambled content.

In some embodiments, once a wearable device and a user computing device are wirelessly connected to each other, the user computing device may execute software programs/algorithms for unscrambling the scrambled data displayed on the screen such that a jumbled alphabets of the image are reconfigured and information within the image makes sense when the screen of the user computing device is viewed through one or more lenses of the wearable device. In some embodiments, the user computing device may execute software programs/algorithms for unscrambling the scrambled data displayed on the screen such that a plurality of segments of the image are reconfigured to original arrangement, and information within the image is readable when the screen of the user computing device is viewed through one or more lenses of the wearable device.

In some embodiments, once a wearable device and a user computing device are wirelessly connected to each other, the user computing device may transmit the scrambled data to the wearable device. The user computing device may also transmit configuration information of the plurality of segments of the scrambled data to the wearable device. In response to receipt of the configuration information of the plurality of segments of the scrambled data, a processor of the wearable device causes the configuration of the plurality of segments to be such that the plurality of segments of the image are reconfigured to original arrangement, and the data in the image is readable by viewing at the one or more lenses.

In some embodiments, a wearable device may include an imaging sensor, which may receive the scrambled data from the user computing device. The imaging sensor or a processor of the wearable device may then generate instructions to execute software programs/algorithms to unscramble the scrambled data. Subsequently, the processor of the wearable device may transmit the unscrambled data to the user computer device for display on the screen of the user computing device. In some cases, the processor of the wearable device may transmit the unscrambled data to a system server, and the system server may then transmit the unscrambled data to the user computer device for display on the screen of the user computing device.

Figure 7:
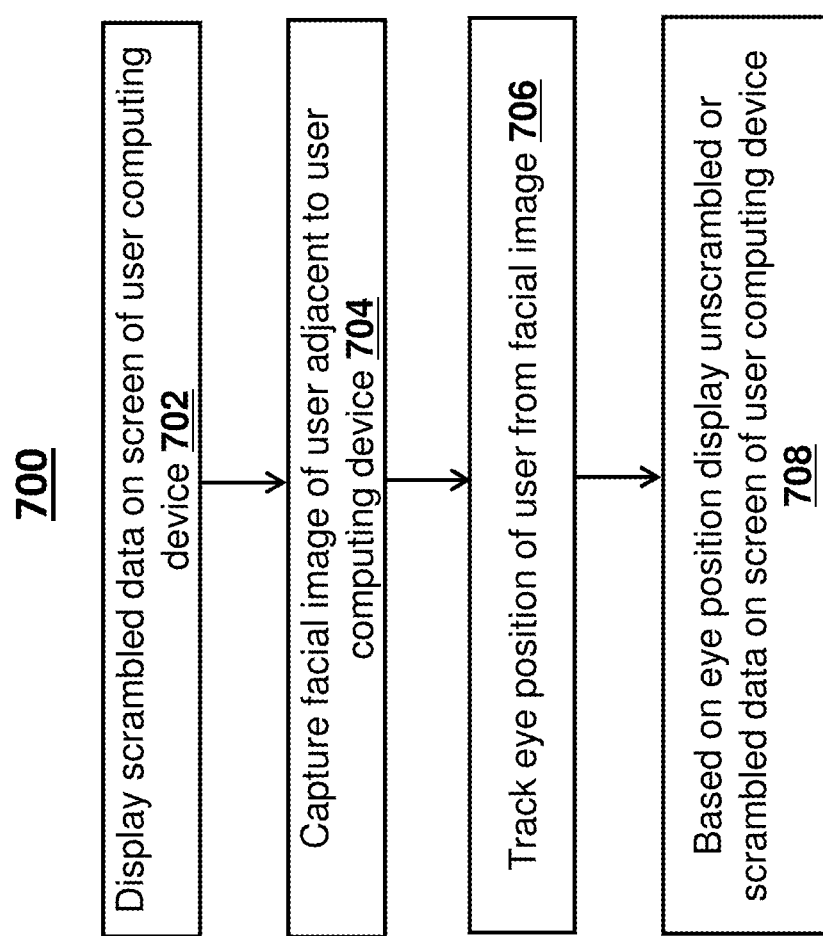
FIG. 7 shows execution of a method showing operations of a distributed data processing and display system, according to an exemplary embodiment.

FIG. 7 shows execution of a method showing operations of a distributed data processing and display system, according to an exemplary method 700. The exemplary method 700 shown in FIG. 7 comprises execution steps 702, 704, 706, and 708. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 700 of FIG. 7 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as user computing device or a server described herein.

In a first step 702, a user computing device may display on its graphical user interface (GUI) or a monitor screen, an image or a video content. The image and/or the video content may include textual or visual data/information.

The screen may be an output device, which displays information such as the image or the video content in pictorial form. The screen may include a display device, circuitry, casing, and power supply. The display device may be a thin film transistor liquid crystal display, light-emitting diode display, or an organic light-emitting diode display. The screen may be connected to the user computing device via VGA, Digital Visual Interface (DVI), HDMI, Display Port, Thunderbolt, low-voltage differential signaling (LVDS) or other proprietary connectors and signals.

Initially, when a user computing device is not being operated by any user, a screen of the user computing device may be scrambled or scrambled data/content may be displayed on the screen that is unreadable to a human. In some embodiments, the scrambled data may correspond to jumbled letters, which may not make any sense to the user. For example, the user computing device or a system server may randomly arrange words and letters, and put words or letters in a wrong order so that they do not make sense (even though maintaining the styles and numbers of letters in each word). The scrambling performed is random and may be undone using one or more unscrambling techniques.

In some embodiments, scrambled data may correspond to a plurality of segments of an image displayed on a screen such that information within segmented image is unreadable by a human. A user computing device and/or a system server associated with the user computing device may generate and execute software programs and/or algorithms to divide the display screen and/or the image on the screen into multiple segments. Upon dividing the display screen and/or the image on the screen into the multiple segments, in one embodiment, the user computing device and/or the system server may orient each of the segment such that the data in the segmented image is unreadable by the human. In another embodiment, upon dividing the display screen and/or the image on the screen into the multiple segments, the user computing device and/or the system server compress each segment such that the data in the segmented image is unreadable by the human. In yet another embodiment, upon dividing the display screen and/or the image on the screen into the multiple segments, the user computing device and/or the system server overturn each segment such that the data in the segmented image is unreadable by the human.

In a next step 704, a user computing device may capture via one or more cameras directly or indirectly associated with the user computing device, a real-time facial image of a user adjacent to a user computing device. In some embodiments, a camera may be a thermal camera, which is configured to capture one or more facial images of a user that will only detect shape of a head of a user and will ignore the user accessories such as glasses, hats, or make up.

The cameras may be used to capture a series of exposures to produce the panoramic image within a region of the user computing device. The camera includes a zoom lens for directing image light from a scene toward an image sensor, and a shutter for regulating exposure time. Both the zoom and the shutter are controlled by a microprocessor in response to control signals received from a system server including a shutter release for initiating image capture. A flash unit may be used to illuminate the scene when needed. The image sensor includes a discrete number of photosite elements or pixels arranged in an array to form individual photosites corresponding to the pixels of the image. The image sensor can be either a conventional charge coupled device (CCD) sensor or a complementary metal oxide semiconductor (CMOS) imager.

The camera may be operable in a regular mode and a panoramic mode, and in different angles to create a 3D model of an image. In the regular mode, the camera captures and produces individual still digital images in a manner well known to those skilled in the art. In the panoramic mode, the camera captures a series of overlapping digital images to be used in constructing a panoramic image. The memory of the camera stores the instructions for the processor for implementing the panoramic mode.

During operation, once images are captured, a user computing device may then determine users within the captured images. The user computing device may implement one or more techniques to identify the users within the captured images. Once the users are identified, then the user computing device may extract face recognition information from a facial image of each user. The face recognition information may correspond to information associated with a shape of a face. In some embodiments, the face recognition information may correspond to features on a surface of a face such as a contour of eye sockets, nose, and chin of a user.

In a next step 706, a user computing device may track eye position of a user based on information retrieved from a real-time facial image of a user. The user computing device may execute eye position tracking technologies on the real-time facial image of the user to track eye position of the user. In one example, the user computing device may use an illuminator, a tracking camera, and an image processor to track the eye position of the user. The illuminator, which may be an infrared illuminator, generates an IR beam that illuminates a user's face. The user's eyes may generate a comparatively high level of reflection relative to other features of the user's face, which may be used to distinguish the position of the eyes from those other features. The tracking camera captures the reflected light from the user's cornea. The image processor locates the position of the user's eyes by examining the image captured by the tracking camera. The position of the user's eyes may be determined relative to the other parts of the user's body.

In a next step 708, a user computing device may determine whether a user is authorized to view readable data on a screen of the user computing device, in response to matching a set of purported identifications associated with a facial image received from cameras with a set of identifications authenticating the user that is stored in a system database. For example, the user computing device may compare and match contour of eye sockets, nose, or chin of a user with a template of face features of known users stored in the database. When there is a match between determined and stored face features, the user is then authenticated, and unscrambled readable data is then displayed on the screen.

In some embodiments, a user computing device may monitor a current eye position of an authenticated user, and only when the current eye position of the authenticated user is determined to be in line of sight with the screen, then the user computing device may display unscrambled readable data on the screen. The user computing device may continuously monitor a current eye position of an authenticated user, and when the current eye position of the authenticated user is determined to not be in line of sight with the screen (i.e., the user is not viewing the screen), then the user computing device may display scrambled data on the screen.

In some embodiments, a user computing device may monitor a head position of an authenticated user, and only when the head position of the authenticated user is determined to be in line of sight with the screen, then the user computing device may display unscrambled readable data on the screen. The user computing device may continuously monitor a current head position of an authenticated user, and when the current head position of the authenticated user is determined to not be in line of sight with the screen (i.e., the head of user is not towards the screen), then the user computing device may display scrambled data on the screen.

In some embodiments, a user computing device may monitor a current eye position and a head position of an authenticated user, and only when the current eye position and the head position of the authenticated user is determined to be in line of sight with the screen, then the user computing device may display unscrambled readable data on the screen. The user computing device may continuously monitor a current eye position and head position of an authenticated user, and when the current eye position and head position of the authenticated user is determined to not be in line of sight with the screen (i.e., the user is not viewing the screen), then the user computing device may display scrambled data on the screen.

Figure 8:
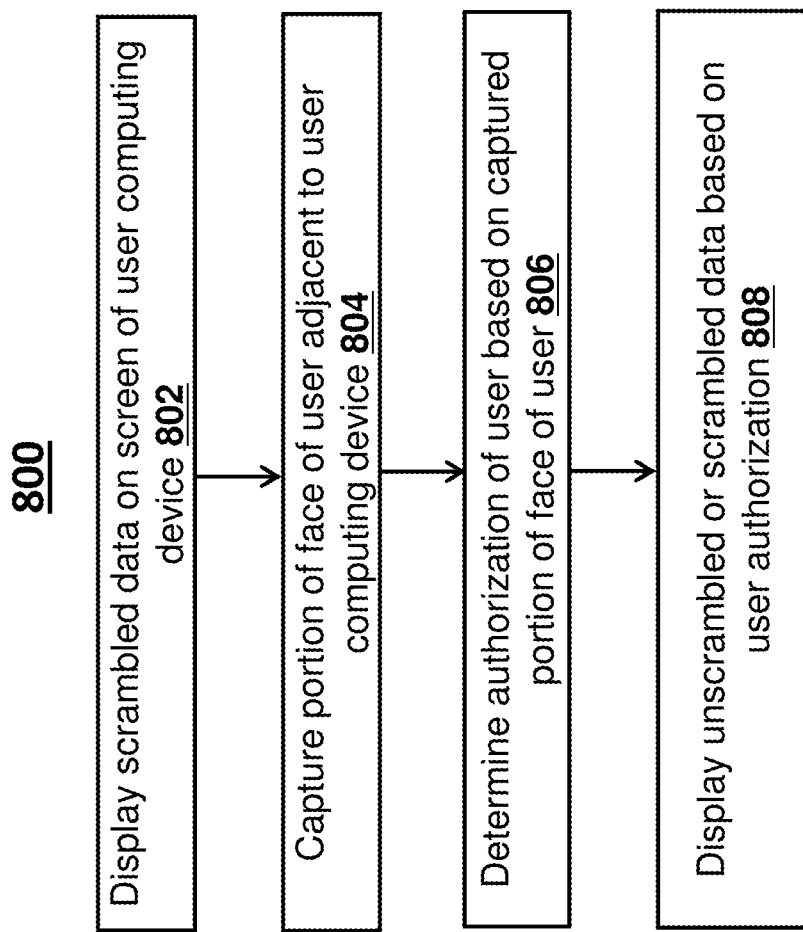
FIG. 8 shows execution of a method showing operations of a distributed data processing and display system, according to an exemplary embodiment.

FIG. 8 shows execution of a method showing operations of a distributed data processing and display system, according to an exemplary method 800. The exemplary method 800 shown in FIG. 8 comprises execution steps 802, 804, 806, and 808. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 800 of FIG. 8 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as user computing device or a server described herein.

In a first step 802, a user computing device may display on its graphical user interface (GUI) or a monitor screen, an image or a video content. The image and/or the video content may include textual or visual data/information.

The screen may be an output device, which displays information such as the image or the video content in pictorial form. The screen may include a display device, circuitry, casing, and power supply. The display device may be a thin film transistor liquid crystal display, light-emitting diode display, or an organic light-emitting diode display. The screen may be connected to the user computing device via VGA, Digital Visual Interface (DVI), HDMI, Display Port, Thunderbolt, low-voltage differential signaling (LVDS) or other proprietary connectors and signals.

Initially, when a user computing device is not being operated by any user, a screen of the user computing device may be scrambled or scrambled data/content may be displayed on the screen that is unreadable by a human. In some embodiments, the scrambled data may correspond to jumbled letters, which may not make any sense to the user. For example, the user computing device or a system server may randomly arrange words and letters, and put words or letters in a wrong order so that they do not make sense (even though maintaining the styles and numbers of letters in each word). The scrambling performed is random and may be undone using one or more unscrambling techniques.

In some embodiments, scrambled data may correspond to a plurality of segments of an image displayed on a screen such that information within segmented image is unreadable by a human. A user computing device and/or a system server associated with the user computing device may generate and execute software programs and/or algorithms to divide the display screen and/or the image on the screen into multiple segments. Upon dividing the display screen and/or the image on the screen into the multiple segments, in one embodiment, the user computing device and/or the system server may orient each of the segment such that the data in the segmented image is unreadable by the human. In another embodiment, upon dividing the display screen and/or the image on the screen into the multiple segments, the user computing device and/or the system server compress each segment such that the data in the segmented image is unreadable by the human. In yet another embodiment, upon dividing the display screen and/or the image on the screen into the multiple segments, the user computing device and/or the system server overturn each segment such that the data in the segmented image is unreadable by the human.

In a next step 804, a user computing device, via one or more image sensors, associated with the user computing device may capture at least a portion of a face of a user adjacent to the user computing device. The image sensor may be used to capture a series of exposures to produce the panoramic image within a region of the image sensor. The image sensor may analyze portion of the face to identify biometric and facial features of the user such as shape of face, shape of eyes, shape of nose, and shape of other parts of the face.

In a next step 806, a user computing device may determine whether a user is authorized to view data on a screen of the user computing device, in response to matching a set of purported identifications associated with a portion of a face received from imaging sensors with a set of identifications authenticating the user that is stored in a system database. In one example, a user computing device may compare and match biometric features of a user with a template of biometric features of known users stored in the database. When there is a match between determined and stored biometric features, the user is then authenticated. In another example, the user computing device may compare and match contour of eye sockets, nose, or chin of a user with a template of such face features of known users stored in the database. When there is a match between determined and stored face features, the user is then authenticated.

In a next step 808, a user computing device may execute software programs and/or algorithms to unlock a screen, unscramble a screen, unscramble scrambled content on a screen such that content is readable by a human, and/or display sensitive data on the screen. In one example, upon the execution of the software programs and/or algorithms, a plurality of segments of segmented and scrambled image are reconfigured to make information within the unscrambled image readable.

Figure 9:
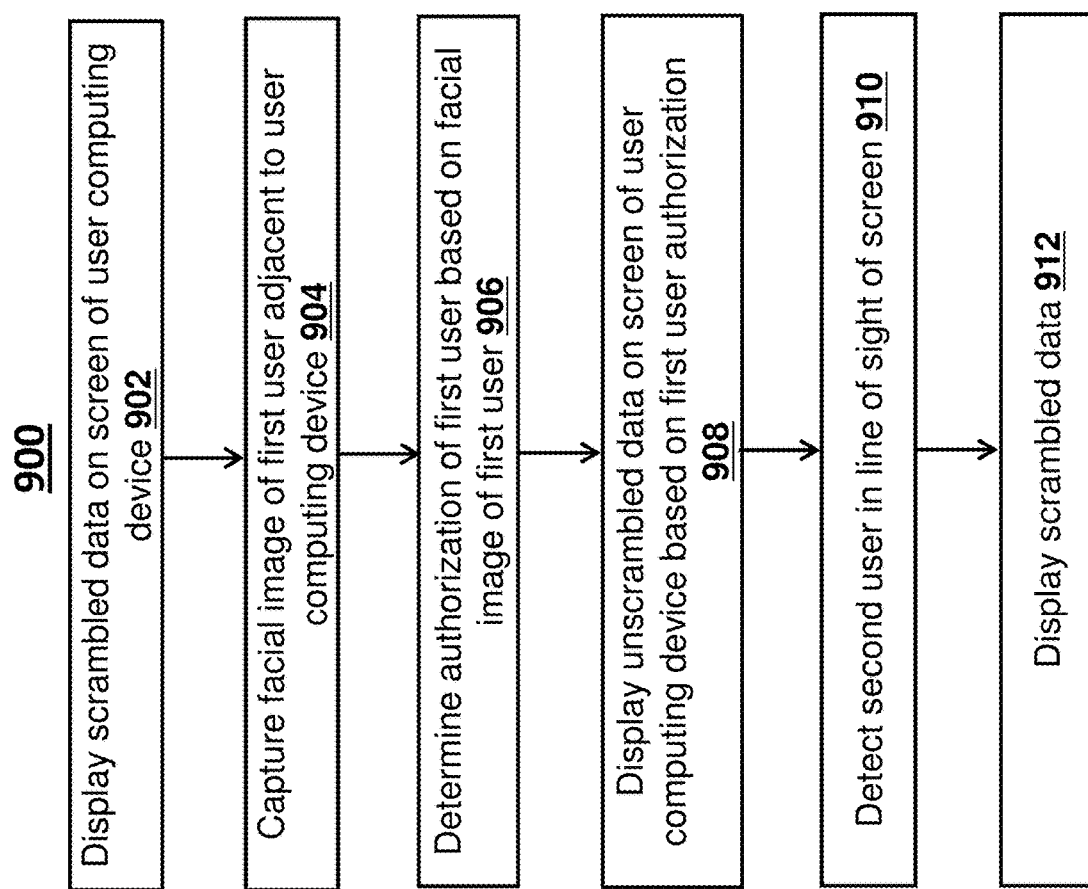
FIG. 9 shows execution of a method showing operations of a distributed data processing and display system, according to an exemplary embodiment.

FIG. 9 shows execution of a method showing operations of a distributed data processing and display system, according to an exemplary method 900. The exemplary method 900 shown in FIG. 9 comprises execution steps 902, 904, 906, 908, 910, and 912. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 900 of FIG. 9 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as user computing device or a server described herein.

In a first step 902, a user computing device may display on its graphical user interface (GUI) or a monitor screen, an image or a video content. The image and/or the video content may include textual or visual data/information.

The screen may be an output device, which displays information such as the image or the video content in pictorial form. The screen may include a display device, circuitry, casing, and power supply. The display device may be a thin film transistor liquid crystal display, light-emitting diode display, or an organic light-emitting diode display. The screen may be connected to the user computing device via VGA, Digital Visual Interface (DVI), HDMI, Display Port, Thunderbolt, low-voltage differential signaling (LVDS) or other proprietary connectors and signals.

Initially, when a user computing device is not being operated by any user, a screen of the user computing device may be scrambled or scrambled data/content may be displayed on the screen that is unreadable by a human. In some embodiments, the scrambled data may correspond to jumbled letters, which may not make any sense to the user. For example, the user computing device or a system server may randomly arrange words and letters, and put words or letters in a wrong order so that they do not make sense (even though maintaining the styles and numbers of letters in each word). The scrambling performed is random and may be undone using one or more unscrambling techniques.

In some embodiments, scrambled data may correspond to a plurality of segments of an image displayed on a screen such that information within segmented image is unreadable by a human. A user computing device and/or a system server associated with the user computing device may generate and execute software programs and/or algorithms to divide the display screen and/or the image on the screen into multiple segments. Upon dividing the display screen and/or the image on the screen into the multiple segments, in one embodiment, the user computing device and/or the system server may orient each of the segment such that the data in the segmented image is unreadable by the human. In another embodiment, upon dividing the display screen and/or the image on the screen into the multiple segments, the user computing device and/or the system server compress each segment such that the data in the segmented image is unreadable by the human. In yet another embodiment, upon dividing the display screen and/or the image on the screen into the multiple segments, the user computing device and/or the system server overturn each segment such that the data in the segmented image is unreadable by the human.

In a next step 904, a user computing device may capture via one or more cameras associated with the user computing device, a real-time facial image of a first user adjacent to a user computing device. For example, a camera may be installed on the user computing device and is an optical instrument for recording or capturing images within an area, which may be stored locally, transmitted to another location, or both. The images may be individual still photographs or sequences of images constituting videos or movies of objects and users within the area. The images captured from the camera are fed to a processor of a user computing device or a system server which segregates the images (based on content within it) and normalize the images. While processing the images captured within the area, the processor of the user computing device may employ face recognition technology for processing the normalized image. The face recognition technology may use pattern recognition and facial expression analysis to recognize first user captured within the images. In one method, the face recognition technology may detect facial area within the images using a neural network. In another method, the face recognition technology may detect facial area within the images using statistical features of facial brightness, which may be a principal component analysis of brightness within the captured images.

In a next step 906, a user computing device may determine whether a first user is authorized to view image data on the screen, in response to matching a set of purported identifications associated with the facial image of the first user received from the one or more sensors with a set of identifications authenticating the first user that is stored in a system database. The set of purported identifications associated with the facial image of the first user comprises face recognition information. The face recognition information may correspond to information associated with a shape of the face. In some embodiments, the face recognition information may correspond to features on a surface of a face such as a contour of eye sockets, nose, and chin of a user. The user computing device may compare and match extracted face features of the user with a template of face features of known users stored in a database. When there is a match between determined and stored face features, the user is then authenticated.

In a next step 908, a user computing device may execute software programs and/or algorithms to unlock a screen, unscramble a screen, unscramble scrambled content on a screen such that content is readable from a naked eye of a first user, and/or display sensitive data on the screen. In one example, upon the execution of the software programs and/or algorithms, a plurality of segments of segmented and scrambled image are reconfigured to make information within the unscrambled image readable to the first user.

In a next step 910, a user computing device upon processing of images captured by one or more sensors and/or cameras may detect a second user with operation area of the one or more sensors and/or cameras. In some cases, when the user computing device determines that there exists the second user within the area of operation of the camera and/or sensor, then the user computing device may determine authorization and authorization status of the user. In some cases, when the user computing device determines that there exists the second user within the area of operation of the camera and/or sensor, then the user computing device may determine whether the second user is in line of sight of a screen. In some cases, when the user computing device determines that there exists the second user within the area of operation of the camera and/or sensor, then the user computing device may determine authorization and authorization status of the user as well as whether the second user is in line of sight of a screen.

In operation, to determine whether a second user is in line of sight of a screen, a user computing device or a system server may determine a location of the second user. The user computing device or the system server may use one or more motion sensors directly or indirectly associated with the user computing device or the system server to determine exact location of the second user. The user computing device or the system server may use one or more location sensors directly or indirectly associated with the user computing device or the system server to determine exact location of the second user. The one or more location sensors may detect the actual location of the second user by generating an electromagnetic beam, such as an infrared or laser beam, and analyzing reflections from the electromagnetic beam to determine the position of the second user based on the reflections. In some embodiments, any suitable location determination technique may be used by the user computing device or the system server to determine the exact location of the second user within the area. The user computing device or the system server upon determining the location of the second user may further determine whether a screen of the user computing device is within viewable range of the second user based on eye position and/or head position of the second user. The user computing device may determine whether the screen is within the viewable range of the second user depending on whether there is an unobstructed line of sight between one or both of the second user eyes and the screen. In some embodiments, whether a screen of the user computing device is within viewable range of the second user may also depend on the distance between the second user eyes and the screen. In some embodiments, whether a screen of the user computing device is within viewable range of the second user may also depend on the distance between the second user and the screen.

In a next step 912, a user computing device or a system server upon identifying that the second user is within the viewable range of a screen may generate and execute software programs to lock the screen, scramble the screen, scramble content on the screen such that content is not readable from a naked eye of the second user, and/or hide sensitive data displayed on the screen (and only display insensitive data). The user computing device or the system server may continuously monitor the location and/or movement of the second user, and upon identifying that the second user has moved away from the viewable range of the screen, may generate and execute software programs to unlock the screen, unscramble the screen, unscramble the content on the screen such that content is readable from a naked eye, and/or display sensitive data displayed on the screen.

Figure 10:
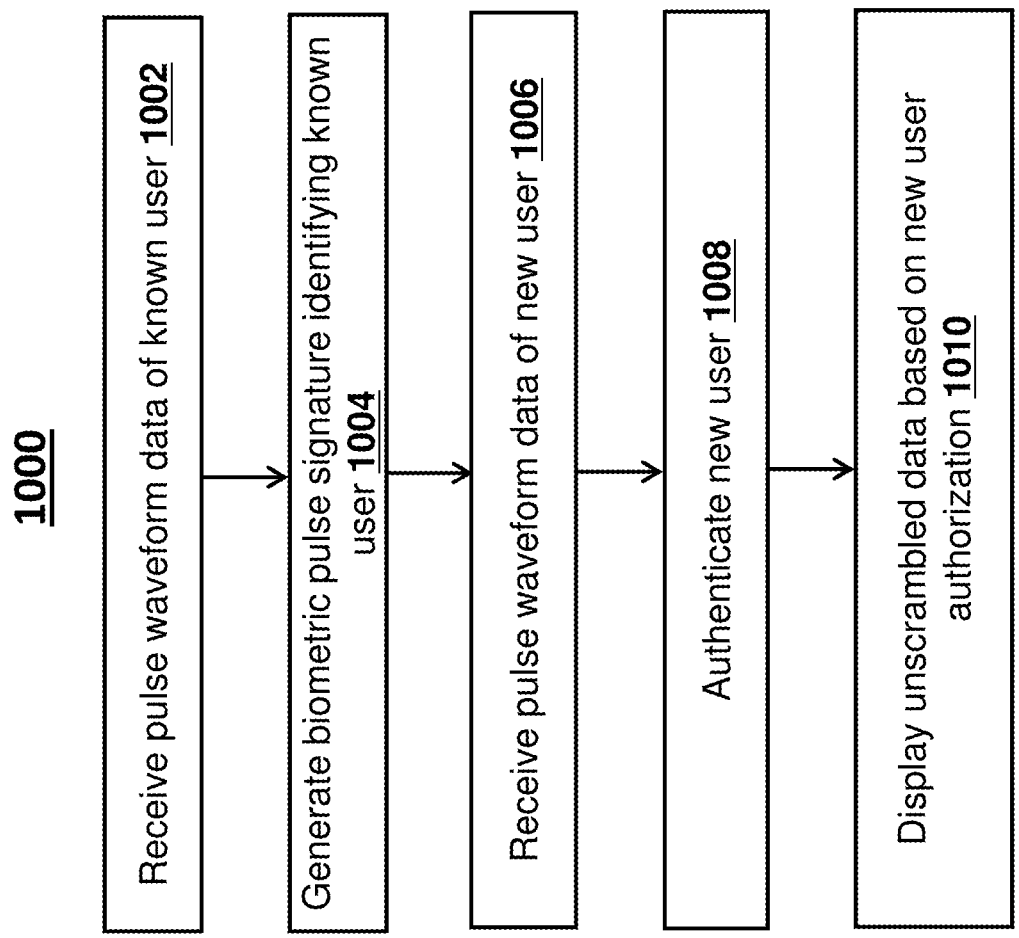
FIG. 10 shows execution of a method showing operations of a distributed data processing and display system, according to an exemplary embodiment.

FIG. 10 shows execution of a method showing operations of a distributed data processing and display system, according to an exemplary method 1000. The exemplary method 1000 shown in FIG. 10 comprises execution steps 1002, 1004, 1006, 1008, and 1010. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 1000 of FIG. 10 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as user computing device or a server described herein.

In a first step 1002, a server may store records of pulse waveform data collected from known users in a database. The pulse waveform data may correspond to measurement of a pulse waveform transit time, blood pressure, respiratory rate, oxygen saturation, and stroke volume in the user.

In some embodiments, the server may receive via one or more pulse sensors, the pulse waveform data collected from one or more measurement positions of a known user. In some embodiments, the server may receive via the one or more pulse sensors, the pulse waveform data collected from the one or more measurement positions of the known user while wearing eyeglasses. In some embodiments, the server may receive via the one or more pulse sensors, the pulse waveform data collected from the one or more measurement positions of the known user while wearing any appropriate wearable device. The one or more measurement positions may include a temple pulse position, a hand pulse position, an eye pulse position, a neck pulse position, or the like. The pulse waveform data is collected from the one or more measurement positions at one or more points on a body of the known user. The one or more points may include one or more blood vessel points of the known user.

The one or more pulse sensors may be electronic devices for detecting the pulse wave of a user from reflected light or transmitted light by irradiating the site of a blood vessel with light having an infrared or near infrared range. In some embodiments, the pulse wave sensor may comprise a pair of a light emitting diode (LED) and a phototransistor (photo detector) is attached to a portion of a body to measure the heart rate by calculating the cycle (frequency) of pulse waves from the waveform of reflected light or transmitted light detected by the above photo detector.

In some embodiments, a pulse sensor may be a piezo-electric sensor. The piezoelectric sensor may be a capacitive electromechanical transducer that generate electrical charge in proportion to applied stress. The piezoelectric sensor may generate an electrical signal that is proportional to the force caused by blood flow (pulse) in the area of the artery or other areas of the body where a pulse could be detected. The piezoelectric sensor may not be mechanically clamped at their periphery, and may be sensitive to longitudinal stress. Although the piezoelectric sensor material is somewhat sensitive to stress applied normal to its thickness and width, the piezoelectric sensor may be designed to be most sensitive to stresses applied normal to its length.

In a next step 1004, a server may store records of biometric pulse signatures characterizing pulse waveform data collected from known users in a database. The biometric pulse signature is unique for each known user, and may be used to uniquely identify and authenticate a known user.

In some embodiments, a server may generate biometric pulse signatures characterizing pulse waveform data identifying known users wearing eyeglasses. In some embodiments, the server may generate biometric pulse signatures characterizing pulse waveform data identifying known users wearing any suitable wearable device. The biometric pulse signature generated for each known user is unique for each known user, and may be used to uniquely identify and authenticate a known user. The biometric pulse signature associated with the known user wearing the eyeglasses or any wearable device may be stored in the database comprising a non-transitory machine readable storage medium configured to store a plurality of biometric pulse signatures associated with a plurality of known users. Each of the plurality of biometric pulse signatures associated with the plurality of known users may be refined over time, for example, by collecting known user pulse data repeatedly and thereby updating known user's biometric signature.

In a next step 1006, a server may receive via one or more pulse sensors, pulse waveform data collected from one or more measurement positions of a new and unknown user (a candidate user). A pulse sensor may be an electronic device configured for detecting the pulse wave of the candidate user from reflected light or transmitted light by irradiating the site of a blood vessel with light having an infrared or near infrared range. The pulse wave sensor may comprise a pair of a light emitting diode (LED) and a phototransistor (photo detector) is attached to a portion of a candidate body to measure the heart rate by calculating the cycle (frequency)

of pulse waves from the waveform of reflected light or transmitted light detected by the above photo detector.

A server may receive via the one or more pulse sensors, the pulse waveform data collected from the one or more measurement positions of the new and unknown user (a candidate user) who is wearing eyeglasses. In some embodiments, the server may receive via the one or more pulse sensors, the pulse waveform data collected from the one or more measurement positions of the new and unknown user (a candidate user) wearing any suitable wearable device. The one or more measurement positions may include a temple pulse position, a hand pulse position, an eye pulse position, a neck pulse position, or the like. The pulse waveform data is collected from the one or more measurement positions at one or more points on a body of the candidate user. The one or more points may include one or more blood vessel points of the candidate user.

In a next step 1008, a server may initiate a process to authenticate a new user (a candidate user), in response to the server determining the pulse waveform data associated with the new user matches at least one biometric pulse signature of the plurality of biometric pulse signatures stored in the system database.

Initially, a server may generate a biometric pulse signature characterizing pulse waveform data identifying a new user wearing eyeglasses. In some embodiments, the server may generate a biometric pulse signature characterizing pulse waveform data identifying a new user wearing any suitable wearable device. The biometric pulse signature generated for new user is unique for the new user, and may be used to uniquely identify and authenticate the new user. For instance, the server may use the new user pulse data and/or biometric pulse signature to determine if the new user pulse data and/or the biometric pulse signature matches any known user records stored in a database. For example, the server may compare the biometric pulse signature of the new user to known users signatures in order to identify the new user.

In a next step 1010, if the new user is identified using the user pulse data records of the new user, that is, the currently detected user pulse data (such as biometric pulse signature) of the new is similar to known user pulse data, the new user may be granted access to a user computing device.

A server may execute software programs/algorithms for unscrambling scrambled data displayed on a screen of a user computing device. For instance, the execution of the software programs/algorithms by the server may result in reconfiguration of the jumbled alphabets of the image such that information within the image makes sense when the screen of the user computing device is viewed through one or more lenses of the wearable device. In some embodiments, the server may execute software programs/algorithms for unscrambling the scrambled data displayed on the screen such that a plurality of segments of the image are reconfigured to original arrangement, and information within the image is readable when the screen of the user computing device is viewed through one or more lenses of the wearable device.

In some embodiments, a server may transmit scrambled data from a user computing device to a wearable device. The server may also transmit configuration information of a plurality of segments of the scrambled data to the wearable device. In response to receipt of the configuration information of the plurality of segments of the scrambled data, a processor of the wearable device causes the configuration of the plurality of segments to be such that the plurality of segments of the image are reconfigured to original arrangement, and the data in the image is readable by viewing though the one or more lenses of the eyeglasses.

In some embodiments, a wearable device may include an imaging sensor, which may receive the scrambled data from a server via a user computing device. The imaging sensor or a processor of the wearable device may then generate instructions to execute software programs/algorithms to unscramble the scrambled data. Subsequently, the processor of the wearable device may transmit the unscrambled data to the user computer device for display on the screen of the user computing device. In some cases, the processor of the wearable device may transmit the unscrambled data to a system server, and the system server may then transmit the unscrambled data to the user computer device for display on the screen of the user computing device.

FIG. 11 shows execution of a method showing operations of a distributed data processing and display system, according to an exemplary method 1100. The exemplary method 1100 shown in FIG. 11 comprises execution steps 1102, 1104, 1106, 1108, 1110, and 1112. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 1100 of FIG. 11 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as user computing device or a server described herein.

In a first step 1102, a server may receive via one or more pulse sensors, pulse waveform data collected from one or more measurement positions of a new user (candidate user). The pulse waveform data may correspond to measurement of a pulse waveform transit time, blood pressure, respiratory rate, oxygen saturation, and stroke volume in the user.

In some embodiments, the server may receive via the one or more pulse sensors, the pulse waveform data collected from the one or more measurement positions of the new user while wearing eyeglasses. In some embodiments, the server may receive via the one or more pulse sensors, the pulse waveform data collected from the one or more measurement positions of the new user while wearing any appropriate wearable device. The one or more measurement positions may include a temple pulse position, a hand pulse position, an eye pulse position, a neck pulse position, or the like. The pulse waveform data is collected from the one or more measurement positions at one or more points on a body of the new user. The one or more points may include one or more blood vessel points of the new user.

The one or more pulse sensors may be electronic devices for detecting the pulse wave of a user from reflected light or transmitted light by irradiating the site of a blood vessel with light having an infrared or near infrared range. In some embodiments, the pulse wave sensor may comprise a pair of a light emitting diode (LED) and a phototransistor (photo detector) is attached to a portion of a body to measure the heart rate by calculating the cycle (frequency) of pulse waves from the waveform of reflected light or transmitted light detected by the above photo detector.

In some embodiments, a pulse sensor may be a piezoelectric sensor. The piezoelectric sensor may be a capacitive electromechanical transducer that generate electrical charge in proportion to applied stress. The piezoelectric sensor may generate an electrical signal that is proportional to the force caused by blood flow (pulse) in the area of the artery or other areas of the body where a pulse could be detected. The piezoelectric sensor may not be mechanically clamped at their periphery, and may be sensitive to longitudinal stress. Although the piezoelectric sensor material is somewhat sensitive to stress applied normal to its thickness and width, the piezoelectric sensor may be designed to be most sensitive to stresses applied normal to its length.

In a next step 1104, a server may generate a biometric pulse signature characterizing pulse waveform data identifying a new user wearing eyeglasses. In some embodiments, the server may generate the biometric pulse signature characterizing pulse waveform data identifying the new user wearing any suitable wearable device. The biometric pulse signature generated for the new user is unique for the new user, and may be used to uniquely identify and authenticate the new user.

In a next step 1106, a server may authenticate a new user (a candidate user), in response to the server determining the pulse waveform data associated with the new user matches at least one biometric pulse signature of the plurality of biometric pulse signatures stored in the system database. For instance, a server may use new user pulse data and/or biometric pulse signature to determine if the new user pulse data and/or the biometric pulse signature matches any known user records stored in a database comprising a non-transitory machine readable storage medium configured to store a plurality of biometric pulse signatures associated with a plurality of known users. Each of the plurality of biometric pulse signatures associated with the plurality of known users may be refined over time, for example, by collecting known user pulse data repeatedly and thereby updating known user's biometric signature. In response to determining that the biometric pulse signature associated with the new user matches at least one biometric pulse signature of the known user stored in the system database, the server identifies and authenticates the new user.

In a next step 1108, if the new user is identified using the user pulse data records of the new user, that is, the currently detected user pulse data (such as biometric pulse signature) of the new is similar to known user pulse data, a server may grant the new user access to unscrambled content on a user computing device. In some embodiments, a server establish a wireless connection (such as Bluetooth connection) between the user computing device and the wearable device after the authentication of the new user. In some embodiments, a wireless connection between the user computing device and the wearable device may be present before the authentication of the new user.

Examples

A server may execute software programs/algorithms for unscrambling scrambled data displayed on a screen of a user computing device. For instance, the execution of the software programs/algorithms by the server may result in reconfiguration of the jumbled alphabets of the image such that information within the image makes sense when the screen of the user computing device is viewed through one or more lenses of the wearable device. In some embodiments, the server may execute software programs/algorithms for unscrambling the scrambled data displayed on the screen such that a plurality of segments of the image are reconfigured to original arrangement, and information within the image is readable when the screen of the user computing device is viewed through one or more lenses of the wearable device.

In some embodiments, a server may transmit scrambled data from a user computing device to a wearable device. The server may also transmit configuration information of a plurality of segments of the scrambled data to the wearable device. In response to receipt of the configuration information of the plurality of segments of the scrambled data, a processor of the wearable device causes the configuration of the plurality of segments to be such that the plurality of segments of the image are reconfigured to original arrangement, and the data in the image is readable by viewing though the one or more lenses of the eyeglasses.

In some embodiments, a wearable device may include an imaging sensor, which may receive the scrambled data from a server via a user computing device. The imaging sensor or a processor of the wearable device may then generate instructions to execute software programs/algorithms to unscramble the scrambled data. Subsequently, the processor of the wearable device may transmit the unscrambled data to the user computer device for display on the screen of the user computing device. In some cases, the processor of the wearable device may transmit the unscrambled data to a system server, and the system server may then transmit the unscrambled data to the user computer device for display on the screen of the user computing device.

In a next step 1110, a server may detect via one or more motion sensors/detectors, a movement of the new user or the wearable device relative to the user computing device. The one or more motion sensors/detectors may be connected to the user computing device, the wearable device, or may be located at any place in a room where the user computing device is situated.

In some embodiments, an electronic motion detector contains an optical, microwave, or acoustic sensor. The changes in the optical, microwave, or acoustic field in the device's proximity are interpreted by the electronics based on one of the sensor technologies. For example, an ultrasonic transducer emits an ultrasonic wave (sound at a frequency higher than a human ear can hear) and receivers reflections from nearby new users. Similar to Doppler radar, detection of the received field indicates motion of the new user. The detected Doppler shift is also at low audio frequencies (for walking speeds of new user) since the ultrasonic wavelength of around a centimeter is similar to the wavelengths used in microwave motion detectors. In another example, infrared sensors may be used, which are sensitive to a user's skin temperature through emitted black body radiation at mid-infrared wavelengths, in contrast to background objects at room temperature. The emitted black body radiation may be used to determine movement of the new user. In yet another example, a camera may be used detect motion of a new user in its field of view using software. The camera may be configured to record video triggered by motion detection of the user. Since the observed field may be normally illuminated, use of camera sensor may be considered passive technology. However it can also be used together with near-infrared illumination to detect motion of user in the dark, that is, with the illumination at a wavelength undetectable by a user eye.

In a next step 1112, a server upon detecting a movement of new user or a wearable device, may then compare a current location of the new user or the wearable device with respect to the user computing device. The server upon determining that a distance between the current location of the new user or the wearable device with respect to the user computing device is more than a pre-defined threshold range (such as Bluetooth range), then the server switch off the connection between the user computing device and the wearable device. In some embodiments, an employer of a user operating a user computing device may determine a value of pre-defined threshold range. The server may also generate and execute instructions to display scrambled screen on the user computing device such that the data on the scrambled screen is not readable for any user.

For example, a server may execute software programs/algorithms for scrambling unscrambled data displayed on a screen of a user computing device. For instance, the execution of the software programs/algorithms by the server may result in configuration of jumbled alphabets of the image such that information within the image does not make sense when the screen of the user computing device is viewed by any user. In some embodiments, the server may execute software programs/algorithms for scrambling the unscrambled data displayed on the screen such that a plurality of segments of the image are configured to an arrangement where information within the image is not readable when view by a human or when the screen of the user computing device is viewed through one or more lenses of the wearable device.

A server may continuously monitor location and/or movement of the user, and upon identifying that the user has moved within the pre-defined threshold range, may generate and execute software programs to again authenticate the user, unlock the screen, unscramble the screen, unscramble the content on the screen such that content is readable from a human, and/or display sensitive data displayed on the screen.

FIG. 12 shows execution of a method showing operations of a distributed data processing and display system, according to an exemplary method 1200. The exemplary method 1200 shown in FIG. 12 comprises execution steps 1202, 1204, 1206, 1208, and 1210. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 1200 of FIG. 12 is described as being executed by a single server computer, referred to as a system server in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as a user computing device or a system server described herein.

In a first step 1202, a server and/or a user computing device may display on its graphical user interface (GUI) or a monitor screen, an image or a video content. The image and/or the video content may include textual or visual data/information. The screen may be an output device, which displays information such as the image or the video content in pictorial form.

Initially, when a user computing device is not being operated by any user, a screen of the user computing device may be scrambled or scrambled data/content may be displayed on the screen that is unreadable by a human. In some embodiments, the scrambled data may correspond to a shadow around one or more fonts in text data of the image or video content such that the text data become unreadable by the human. In some embodiments, the scrambled data may correspond to jumbled letters, which may not make any sense to the user. For example, the user computing device or a system server may randomly arrange words and letters, and put words or letters in a wrong order so that they do not make sense (even though maintaining the styles and numbers of letters in each word). The scrambling performed is random and may be undone using one or more unscrambling techniques.

In some embodiments, scrambled data may correspond to a plurality of segments of an image displayed on a screen such that information within segmented image is unreadable by a human. A user computing device and/or a system server associated with the user computing device may generate and execute software programs and/or algorithms to divide the display screen and/or the image on the screen into multiple segments. Upon dividing the display screen and/or the image on the screen into the multiple segments, in one embodiment, the user computing device and/or the system server may orient each of the segment such that the data in the segmented image is unreadable by the human. In another embodiment, upon dividing the display screen and/or the image on the screen into the multiple segments, the user computing device and/or the system server compress each segment such that the data in the segmented image is unreadable by the human. In yet another embodiment, upon dividing the display screen and/or the image on the screen into the multiple segments, the user computing device and/or the system server overturn each segment such that the data in the segmented image is unreadable by the human.

In a next step 1204, a server and/or a user computing device may receive a request for a wired or wireless connection from a wearable device. The wearable device may be a display device in form of eyeglasses, goggles, or any other structure comprising a frame that supports and incorporates various components of the wearable device, as well as serves as a conduit for electrical and other component connections.

A user computing device may transmit a request for the wired or the wireless connection to the wearable device when the wearable device is within a range of the user computing device. Each of the user computing device and the wearable device may include communication components, one or more transmitters, and one or more receivers. In one example, a transmitter of a user computing device may first identify and then transmit a request for connection to a receiver of a wearable device. In another example, a transmitter of a wearable device may first identify and then transmit a request for connection to a transmitter of a user computing device.

A transmitter and a receiver may communicate to each other with or without communication components. The communications component may include electromechanical components (e.g., processor, antenna) that allow the communications component to communicate various types of data with the receivers, transmitters, and/or other components of the transmitters. In some implementations, communications signals between the transmitter and the receiver may represent a distinct channel for hosting communications. The data may be communicated using the communications signals, based on predetermined wired or wireless protocols and associated hardware and software technology. The communications component may operate based on any number of communication protocols, such as Bluetooth®, Wireless Fidelity (Wi-Fi), Near-Field Communications (NFC), ZigBee, and others. However, it should be appreciated that the communications component is not limited to these technologies, but may include radar, infrared, and sound devices as well.

In a next step 1206, a server may connect a user computing device to a wearable device. The user computing device may connect to the wearable device, in response to the user computing device determining that a set of purported credentials associated with the wearable device received from the wearable device through communications signals matches a set of credentials authenticating the wearable device that are stored in a system database. For example, after the communication channel between the user computing device and the wearable device is established, then the user computing device may generate a graphical user interface (GUI) on the user computing device containing a credentials prompt requesting a user of the wearable device to input a set of user credentials. In some cases, after the communication channel between the user computing device and the wearable device is established, then the user computing device may transmit to the wearable device the GUI containing the credentials prompt. The wearable may then transmit to the user computing device, the set of user credentials, in response to the credentials prompt. The user computing device may then match the set of user credentials received from the wearable device with a set of credentials authenticating the wearable device that are stored in a system database. Once the match is confirmed, then the wearable device and the user computing device may be authenticated and connected. In some embodiments, upon the user computing device receiving the set of user credentials from the wearable device, in response to the credentials prompt, the user computing device may transmit the set of user credentials to a system server, which may be directly or indirectly connected to the user computing device. The system server may then match the set of user credentials received from the wearable device with a set of credentials authenticating the wearable device that are stored in a system database. Once the match is confirmed, the system server may authenticate the wearable device and the user computing device, and connect them to each other.

In some embodiments, during operation, a user computing device may receive a request from a wearable device to become a trusted wearable device for allowing a user using the wearable device access to content on a screen of the user computing device. The request may be generated in any suitable manner. For example, the user of the wearable device logs into a secure display application service installed on the user computing device and/or the wearable device where the request is generated. The user may log into the secure display application service by entering username and/or user ID of a user. When the user enters the login details, a request for authorizing the wearable device to become the trusted device may be generated, and then transmitted to a user computing device and/or a system server.

Upon the receipt of the request by the user computing device and/or the server, the user computing device and/or the server may implement a series of security protocols in order to verify the wearable device and the user. For instance, in a first layer of security protocol implemented by the user computing device and/or the server, the user computing device and/or the server may generate a security code that may be transmitted to a phone number of a mobile device of the user, and the user may be requested to read and/or enter the code on an user interface of the user computing device. The code may include a secret token, which may be, for example, a globally unique identifier (GUID), such as for example but not limited to a unique string of characters including, but not limited to letters or numbers or both. In another example, the code may also include one or more Uniform Resource Locators (URLs). In some embodiments, the code may be associated with an expiry time. The expiry time may be included in the code. The user may then read and enter the code into an user interface of the user computing device to establish secure connection and synchronization between the user computing device and the wearable device.

In a next step 1208, a server and/or a user computing device may generate and execute instructions to adjust a focus value of one or more lenses of a wearable device. A button may be placed on the wearable device, and a processor of the wearable device may receive instructions from the server and/or the user computing device to adjust a focus value of one or more lenses. In some embodiments, the server and/or the user computing device may directly activate the button of the wearable device to adjust a focus value of one or more lenses.

The server and/or the user computing device may adjust the focus value of the one or more lenses to synchronize with respect to readability of the screen and/or a page displayed on the screen. The user computing device may adjust the focus value of the one or more lenses to synchronize with respect to readability of the screen and/or a page displayed on the screen based on the one or more attributes associated with the session. The one or more attributes associated with the session may include an identifier associated with the user computing device, an identifier associated with the wearable device, and an identifier of one or more users associated with the wearable device. The server and/or the user computing device may adjust the focus value of the one or more lenses to synchronize with respect to readability of the screen and/or a page displayed on the screen for each new session based on one or more attributes associated with each new session.

In some embodiments, a server and/or a user computing device may adjust the focus value of the one or more lenses to synchronize with respect to the readability of the screen and/or a page displayed on the screen, based on a current eye position of a user wearing the wearable device. In some embodiments, a server and/or a user computing device may adjust the focus value of the one or more lenses to synchronize with respect to the readability of the screen and/or a page displayed on the screen, based on a current eye position of a user wearing the wearable device in addition to one or more session attributes. The server and/or the user computing device may monitor a current eye position of the user using one or more motion detector and sensor devices. The one or more motion detector and sensor devices may be directly or indirectly associated with the user computing device and/or the server. For example, using the information obtained from the motion detector and sensor devices, when it is determined by the server and/or the user computing device that the user is looking at the screen based on the current eye position of the user, then the server and/or the user computing device may adjust the focus value of the one or more lenses to synchronize with respect to readability of the screen and/or a page displayed on the screen based on the current eye position of the user, which is that the user is looking at the screen.

The one or more motion detector and sensor devices may continuously monitor movement of the eyes of the user, and when using information obtained from the motion detector and sensor devices, it is determined by the server and/or the user computing device that the user is not looking at the screen based on the current eye position of the user, then the server and/or the user computing device may adjust the focus value of the one or more lenses to synchronize with respect to readability of the portion of the user computing device which the user is looking at based on the current eye position of the user. For example, when using information obtained from the motion detector and sensor devices, it is determined by the server and/or the user computing device that the user is looking at a keyboard of the user computing device based on the current eye position of the user, then the server and/or the user computing device may adjust the focus value of the one or more lenses to synchronize with respect to readability of text on the keyboard which the user is looking at based on the current eye position of the user.

In a next step 1210, a user computing device may execute software programs/algorithms for unscrambling the scrambled data displayed on the screen. For instance, the user computing device may execute software programs/algorithms for unscrambling the scrambled data displayed on the screen such that the shadow is removed and the one or more fonts in the image are readable when the screen of the user computing device is viewed through the one or more lenses with adjusted focus value.

In some embodiments, the user computing device may execute software programs/algorithms for unscrambling the scrambled data displayed on the screen such that jumbled alphabets of the image are reconfigured and information within the image makes sense when the screen of the user computing device is viewed through one or more lenses of the wearable device with adjusted focus value. In some embodiments, the user computing device may execute software programs/algorithms for unscrambling the scrambled data displayed on the screen such that a plurality of segments of the image are reconfigured to original arrangement, and information within the image is readable when the screen of the user computing device is viewed through one or more lenses of the wearable device with adjusted focus value.

In some embodiments, a user computing device may transmit the scrambled data to the wearable device. The user computing device may also transmit configuration information of the plurality of segments of the scrambled data to the wearable device. In response to receipt of the configuration information of the plurality of segments of the scrambled data, a processor of the wearable device causes the configuration of the plurality of segments to be such that the plurality of segments of the image are reconfigured to original arrangement, and the data in the image is readable by viewing at the one or more lenses.

In some embodiments, a wearable device may include an imaging sensor, which may receive the scrambled data from the user computing device. The imaging sensor or a processor of the wearable device may then generate instructions to execute software programs/algorithms to unscramble the scrambled data. Subsequently, the processor of the wearable device may transmit the unscrambled data to the user computer device for display on the screen of the user computing device. In some cases, the processor of the wearable device may transmit the unscrambled data to a system server, and the system server may then transmit the unscrambled data to the user computer device for display on the screen of the user computing device.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via memory sharing, message passing, token passing, network transmission, or the like.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
   receiving, by a server, via one or more pulse sensors, pulse waveform data collected from one or more measurement positions of a known user while wearing a wearable device, wherein the one or more measurement positions comprises at least a temple pulse position and a wrist pulse position;
   generating, by the server, a biometric pulse signature characterizing the pulse waveform data identifying the known user wearing the wearable device, wherein the biometric pulse signature associated with the known user wearing the wearable device is stored in a system database comprising a non-transitory machine readable storage medium configured to store a plurality of biometric pulse signatures associated with a plurality of known users;
   receiving, by the server, via the one or more pulse sensors, pulse waveform data collected from the one or more measurement positions of a new user wearing the wearable device;
   authenticating, by the server, the new user, in response to the server determining the pulse waveform data associated with the new user matches at least one biometric pulse signature of the plurality of biometric pulse signatures stored in the system database; and
   transmitting, by the server, instructions to a user computing device to convert scrambled data displayed on a screen of the user computing device into unscrambled data,
      whereby the screen of the user computing device displays the unscrambled data as a plurality of segments in a predetermined configuration, at least a portion of the segments not readable without the wearable device, and
      wherein the unscrambled data is readable when the screen of the user computing device is viewed through one or more lenses of the wearable device by the new user, the one or more lenses having a segment configuration corresponding to the predetermined configuration of the plurality of segments displayed on the user computing device.

2. The method according to claim 1, wherein the one or more measurement positions further comprises a hand pulse, an eye pulse, and a neck pulse.

3. The method according to claim 1, further comprising:
   displaying, by the server, a graphical user interface on the user computing device containing a credentials prompt; and
   receiving, by the server, a set of user credentials in response to the credentials prompt, the set of user credentials comprises user ID and password data.

4. The method according to claim 1, wherein the pulse waveform data is collected from the one or more measurement positions at one or more points, wherein the one or more points comprises one or more blood vessel points.

5. The method according to claim 1, wherein the user computing device comprising the screen configured to display an image comprising the scrambled data that is unreadable to a human, and wherein the scrambled data corresponds to a plurality of segments of the image that are configured such that the data in the image is unreadable to the human.

6. The method according to claim 5, wherein converting the scrambled data into the unscrambled data comprises reconfiguring the plurality of segments of the image such that information in the image is readable when the screen of the user computing device is viewed through the one or more lenses.

7. The method according to claim 1, wherein the wearable device comprises an imaging sensor configured to receive the scrambled data from the user computing device; unscramble the scrambled data; and transmit the unscrambled data to the user computer device for display on the screen of the user computing device.

8. The method according to claim 1, further comprising:
   establishing, by the server, a wireless connection between the user computing device and the wearable device, wherein the wireless connection is a Bluetooth connection; and
   displaying, by the server, the scrambled screen on the user computing device such that the data on the scrambled screen is not readable for the user in response to detection of movement of the user beyond Bluetooth range.

9. A system, comprising:
   a system database hosted on one or more servers comprising a non-transitory machine readable storage medium, the system database configured to store a plurality of biometric pulse signatures associated with a plurality of known users;
   one or more pulse sensors is configured to collect pulse waveform data from one or more measurement positions of a known user wearing a wearable device, wherein the one or more measurement positions comprises at least a temple pulse position and a wrist pulse position; and
   a server configured to:
      receive the pulse waveform data of the known user from the one or more pulse sensors;
      generate a biometric pulse signature characterizing the pulse waveform data identifying the known user wearing the wearable device, wherein the biometric pulse signature associated with the known user wearing the wearable device is stored in the system database;
      receive from the one or more pulse sensors, pulse waveform data collected from the one or more measurement positions of a new user wearing the wearable device;
      authenticate the new user, in response to determining that the pulse waveform data associated with the new user matches at least one biometric pulse signature of the plurality of biometric pulse signatures stored in the system database; and
      transmit instructions to a user computing device to convert scrambled data displayed on a screen of the user computing device into unscrambled data,
         whereby the screen of the user computing device displays the unscrambled data as a plurality of segments in a predetermined configuration, at least a portion of the segments not readable without the wearable device, and wherein the unscrambled data is readable when the screen of the user computing device is viewed through one or more lenses of the wearable device by the new user, the one or more lenses having a segment configuration corresponding to the predetermined configuration of the plurality of segments displayed on the user computing device.

10. The system according to claim 9, wherein the one or more measurement positions further comprises a hand pulse, an eye pulse, and a neck pulse.

11. The system according to claim 9, wherein the server is further configured to:
   display a graphical user interface on the user computing device containing a credentials prompt; and
   receive a set of user credentials in response to the credentials prompt, the set of user credentials comprises user ID and password data.

12. The system according to claim 9, wherein the pulse waveform data is collected from the one or more measurement positions at one or more points, wherein the one or more points comprises one or more blood vessel points.

13. The system according to claim 9, wherein the user computing device comprising the screen configured to display an image comprising the scrambled data that is unreadable to a human, and wherein the scrambled data corresponds to a plurality of segments of the image that are configured such that information in the image is unreadable to the human.

14. The system according to claim 13, wherein converting the scrambled data into the unscrambled data comprises reconfiguring the plurality of segments of the image such that information in the image is readable when the screen of the user computing device is viewed through the one or more lenses.

15. The system according to claim 9, wherein the wearable device comprises an imaging sensor configured to receive the scrambled data from the user computing device; unscramble the scrambled data; and transmit the unscrambled data to the user computer device for display on the screen of the user computing device.

16. A method, comprising:
   receiving, by a server, via one or more pulse sensors, pulse waveform data collected from one or more measurement positions of a user while wearing a wearable device, wherein the one or more measurement positions comprises at least a temple pulse position and a wrist pulse position;
   generating, by the server, a biometric pulse signature characterizing the pulse waveform data identifying the user wearing the wearable device;
   authenticating, by the server, the user, in response to the server determining the biometric pulse signature associated with the user matches at least one biometric pulse signature of a known user stored in a system database comprising a non-transitory machine readable storage medium configured to store a plurality of biometric pulse signatures associated with a plurality of known users;
   in response to authentication of the user, displaying, by the server, on a screen of a user computing device, data, whereby the screen of the user computing device displays the unscrambled data as a plurality of segments in a predetermined configuration, at least a portion of the segments not readable without the wearable device, and
   wherein the data is readable when the screen of the user computing device is viewed through one or more lenses of the wearable device by the user, the one or more lenses having a segment configuration corresponding to the predetermined configuration of the plurality of segments;
   detecting, by the server, via one or more motion sensors, a movement of at least the user or the wearable device relative to the user computing device; and
   in response to detection of movement of the user beyond a pre-defined range, displaying, by the server, scrambled screen on the user computing device such that the data on the scrambled screen is not readable for the user.

17. The method according to claim 16, wherein the one or more measurement positions further comprises a hand pulse, an eye pulse, and a neck pulse.

18. The method according to claim 16, wherein the pulse waveform data corresponds to measurement of a pulse waveform transit time, blood pressure, respiratory rate, oxygen saturation, and stroke volume in the user.

19. The method according to claim 16, further comprising:
   displaying, by the server, a graphical user interface on the user computing device containing a credentials prompt; and
   receiving, by the server, a set of user credentials in response to the credentials prompt, the set of user credentials comprises user ID and password data.

20. The method according to claim 16, wherein the pulse waveform data is collected from the one or more measurement positions at one or more points, wherein the one or more points comprises one or more blood vessel points.

* * * * *